US012373711B2

(12) United States Patent
Burns et al.

(10) Patent No.: US 12,373,711 B2
(45) Date of Patent: *Jul. 29, 2025

(54) SYSTEMS AND METHODS FOR CALCULATING A PREDICTED TIME WHEN A USER WILL BE EXPOSED TO A SPOILER OF A MEDIA ASSET

(71) Applicant: Adeia Guides Inc., San Jose, CA (US)

(72) Inventors: Mathew C. Burns, Dublin, CA (US); Jonathan A. Logan, Mountain View, CA (US); Gabriel C. Dalbec, Bethel Island, CA (US); Ajay Kumar Gupta, Andover, CA (US); Alexander W. Liston, Menlo Park, CA (US); Margret B. Schmidt, Redwood City, CA (US); William L. Thomas, Evergreen, CA (US)

(73) Assignee: Adeia Guides Inc., San Jose, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/951,933

(22) Filed: Sep. 23, 2022

(65) Prior Publication Data
US 2023/0153653 A1    May 18, 2023

Related U.S. Application Data

(63) Continuation of application No. 16/495,490, filed as application No. PCT/US2017/023773 on Mar. 23, 2017, now Pat. No. 11,488,033.

(51) Int. Cl.
*G06N 5/04* (2023.01)
*G06F 16/48* (2019.01)
(Continued)

(52) U.S. Cl.
CPC .............. *G06N 5/04* (2013.01); *G06F 16/48* (2019.01); *H04L 65/60* (2013.01); *H04N 21/466* (2013.01);
(Continued)

(58) Field of Classification Search
CPC .......... G06N 5/04; G06F 16/48; H04L 65/60; H04N 21/466; H04N 21/4821; H04N 21/8405
See application file for complete search history.

(56) References Cited

U.S. PATENT DOCUMENTS 6,239,794 B1  5/2001  Yuen et al.
6,564,378 B1  5/2003  Satterfield et al.
(Continued)

FOREIGN PATENT DOCUMENTS

EP    2645364 A1    10/2013
JP    2003316386 A  11/2003
(Continued)

OTHER PUBLICATIONS

U.S. Appl. No. 17/965,277, filed Oct. 13, 2022, Sashikumar Venkataraman.

*Primary Examiner* — Jason Salce
(74) *Attorney, Agent, or Firm* — Haley Guiliano LLP

(57) ABSTRACT

Methods and systems are described herein for calculating a predicted time when a first user will be exposed to a spoiler of a first media asset. A media guidance application may retrieve an initial transmission time of the first media asset and a transmission time of a second media asset that precedes the transmission time of the first media asset. The media guidance application may retrieve electronic communications from a second user whose electronic communications the first user has viewed, and determine a subset of the electronic communications that correspond to the second (Continued)

media asset. The media guidance application may calculate a length of time from the transmission time of the second media asset to the earliest availability time of an electronic communication in the subset. The media guidance application may calculate the predicted time based on the transmission time of the first media asset and the length of time.

20 Claims, 8 Drawing Sheets

(51) Int. Cl.
    *H04L 65/60*     (2022.01)
    *H04N 21/466*     (2011.01)
    *H04N 21/482*     (2011.01)
    *H04N 21/8405*     (2011.01)

(52) U.S. Cl.
    CPC ..... *H04N 21/4821* (2013.01); *H04N 21/8405* (2013.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,249,876 B1 | 8/2012 | Ainslie |
| 9,123,339 B1 | 9/2015 | Shaw et al. |
| 9,462,342 B2 | 10/2016 | Krishnamurthy |
| 9,473,730 B1 | 10/2016 | Roy et al. |
| 10,339,917 B2 | 7/2019 | Aleksic et al. |
| 11,488,033 B2 | 11/2022 | Burns et al. |
| 11,521,608 B2 | 12/2022 | Sreedhara |
| 2003/0216912 A1 | 11/2003 | Chino |
| 2006/0182291 A1 | 8/2006 | Kunieda et al. |
| 2009/0006368 A1 | 1/2009 | Mei et al. |
| 2010/0153885 A1 | 6/2010 | Yates |
| 2013/0097101 A1 | 4/2013 | Ortiz |
| 2013/0262117 A1 | 10/2013 | Heckmann |
| 2013/0347038 A1 | 12/2013 | Lee |
| 2015/0206535 A1 | 7/2015 | Iwai |
| 2015/0234820 A1 | 8/2015 | Aravamudan |
| 2015/0237464 A1* | 8/2015 | Shumaker ............... H04L 51/52 709/204 |
| 2015/0279363 A1 | 10/2015 | Furumoto |
| 2015/0348548 A1 | 12/2015 | Piernot et al. |
| 2015/0382061 A1 | 12/2015 | Maisenbacher et al. |
| 2016/0142783 A1 | 5/2016 | Bagga et al. |
| 2016/0188574 A1 | 6/2016 | Homma et al. |
| 2016/0188729 A1 | 6/2016 | Ardhanari et al. |
| 2016/0191999 A1* | 6/2016 | Friedrich ........... H04N 21/4821 725/39 |
| 2016/0274744 A1 | 9/2016 | Neumann et al. |
| 2017/0069309 A1 | 3/2017 | Aleksic et al. |
| 2017/0160813 A1 | 6/2017 | Divakaran et al. |
| 2018/0151176 A1 | 5/2018 | Qian et al. |
| 2019/0287533 A1 | 9/2019 | Homma et al. |
| 2020/0357391 A1 | 11/2020 | Ghoshal et al. |
| 2023/0134240 A1 | 5/2023 | Venkataraman et al. |

FOREIGN PATENT DOCUMENTS

| | | |
|---|---|---|
| JP | 2004510209 A | 4/2004 |
| JP | 2006209069 A | 8/2006 |
| JP | 2008097082 A | 4/2008 |
| JP | 2010128015 A | 6/2010 |
| JP | 2011059194 A | 3/2011 |
| JP | 2016062069 A | 4/2016 |
| JP | 2016180917 A | 10/2016 |
| KR | 20070061266 A | 6/2007 |
| WO | 2002027711 | 4/2002 |
| WO | 2014182771 A1 | 11/2014 |
| WO | 2016020464 | 2/2016 |
| WO | 2016020464 A1 | 2/2016 |

* cited by examiner

800

801 Initialization subroutine

805 Retrieve instances of Variable A and Variable B

806 For each set of instances of Variable A and Variable B

807 Store Variable A in A

808 Store Variable B in B

809 If A == B

810     Assign equal values to weights of Variable A and Variable B

811 Elseif A<B

812     Adjust weight of Variable B to be greater than weight of Variable A

813 Else

814     Adjust weight of Variable A to be greater than weight of Variable B

816 Termination subroutine

1001 Initialization subroutine, count=0
1005 Retrieve instances of words
1006 For each word
1007  Query database for entries matching word
1008  If entries match word
                Goto 1012
    Else
                Goto 1011
1011  If entries similar to word
                Goto 1012
    Else
                Goto 1017
1012 count=count+1
1017 Termination subroutine

FIG. 10

SYSTEMS AND METHODS FOR CALCULATING A PREDICTED TIME WHEN A USER WILL BE EXPOSED TO A SPOILER OF A MEDIA ASSET

CROSS-REFERENCE TO RELATED APPLICATIONS

This application is a continuation application of U.S. application Ser. No. 16/495,490, filed Sep. 19, 2019 (now allowed), which is a national stage application under 35 U.S.C. § 371 of International Application PCT/US2017/023773, filed Mar. 23, 2017. The disclosure of both applications are hereby incorporated by reference herein in their respective entireties.

BACKGROUND

A spoiler is information about the plot of a media asset that can spoil a viewer's sense of surprise or suspense. The related art is directed to preventing users from viewing spoilers by removing or providing warnings about spoilers when users are confronted by spoilers. However, the related art does not assist a user in viewing media assets before the user is likely to encounter unwanted spoilers.

SUMMARY

Accordingly, systems and methods are described herein for calculating a predicted time when a user will be exposed to a spoiler of a media asset. The calculation may be based on how long it previously took another user, with whom the user communicates, to transmit an electronic communication (e.g., text message, email, social media post, internet article) about a previous media asset after the previous media asset aired. The calculation may further assume that it will take that same length of time for the other user to transmit an electronic communication (which may contain spoilers) about the present media asset after the present media asset airs.

In some embodiments, a media guidance application may determine that a first media asset has been transmitted for the first time. The media guidance application may identify a second media asset that was transmitted for the first time before the first media asset was transmitted. The media guidance application may analyze electronic communications transmitted by a second user whose electronic communications the first user views. In particular, the media guidance application may find the second user's earliest electronic communication about the second media asset. The media guidance application may calculate a length of time that elapsed between transmission of the second media asset and this earliest electronic communication. The media guidance application may calculate the predicted time of spoilage of the first media asset based on this length of time and the transmission time of the first media asset. For example, the media guidance application may add the length of time to the transmission time to calculate the predicted time of spoilage. As used herein, "predicted time of spoilage" is an abbreviated term referring to the predicted time when a user will be exposed to a spoiler of a media asset.

For example, if the first media asset is an episode of the television show Parks and Recreation, the media guidance application may find the earliest social media post about an episode of another show, The Americans, posted by a friend of the user whose posts the user views. If the episode of The Americans aired on February 14, and the friend's earliest social media post about the episode of The Americans was on February 16, the media guidance application may calculate that it took the friend two days to post about the episode of The Americans. Thus, if the episode of Parks and Recreation aired on February 21, the media guidance application may estimate, based on the earlier actions of the friend, that the friend will first post about the episode of Parks and Recreation two days later, on February 23. Because this first post may contain spoilers, and because the user views this friend's posts, the media guidance application calculates February 23 as the predicted time of spoilage of the episode of Parks and Recreation. This can be helpful because if the media guidance application alerts the user that the episode of Parks and Recreation is predicted to be spoiled on February 23, the user may be encouraged to watch the current episode before February 23. Therefore, the user may watch the episode before being confronted with spoilers in the first place.

To this end, in some aspects of the disclosure, a media guidance application executed by control circuitry of a user equipment device or remote server may retrieve a first transmission time of a first media asset that has been initially released by way of simultaneous transmission to a plurality of viewers at the first transmission time, where the first media asset was not previously simultaneously transmitted to the plurality of viewers prior to the first transmission time. For example, the first media asset may be an episode of a television series and the first transmission time may be the release date of the episode.

In some embodiments, the media guidance application may retrieve a second transmission time of a second media asset that has been initially released by way of simultaneous transmission to the plurality of viewers at the second transmission time, where the second media asset was not previously simultaneously transmitted to the plurality of viewers prior to the second transmission time, and where the second transmission time precedes the first transmission time. For example, the second media asset may be an episode of a different television series from the television series of the first media asset. For example, the second transmission time may be the air date of the second media asset. For example, if the first transmission time is Wednesday, Feb. 11, 2015, at 8:00 pm Eastern Standard Time, the second transmission time may be Wednesday, Feb. 4, 2015, at 8:00 pm Eastern Standard Time, which precedes the first transmission time.

In some embodiments, the media guidance application may retrieve a first plurality of electronic communications transmitted from a second user, where the first user has viewed at least one of the first plurality of electronic communications. For example, the second user may be an individual, or a group of individuals, or an organization. For example, the electronic communications may be text messages, emails, posts on social media networks, or articles on the internet.

In some embodiments, the media guidance application may retrieve information regarding a respective time when each electronic communication in the first plurality of electronic communications was made available for the first user's viewing. For example, the availability time of a text message or email may be the time when the text message or email is sent by the second user. For example, the availability time of a social media post may be the time when the post is posted by the second user. For example, the availability time of an internet article may be the time when it is published on the internet. For example, the media guidance application may retrieve the information regarding availability time from a database, or process metadata associated with the electronic communications to retrieve the information regarding availability time, or process the electronic communications themselves to retrieve the information regarding availability time.

In some embodiments, the media guidance application may determine a first subset of the first plurality of electronic communications, where each electronic communication in the first subset references the second media asset, by comparing respective words from each respective electronic communication of the first plurality of electronic communications with first keywords, where the first keywords correspond to the second media asset. For example, the first keywords may be actors, characters, directors, writers, plot details locations, an official hashtag associated with the second media asset, etc., corresponding to the second media asset.

In some embodiments, the media guidance application may further determine the first subset by determining that a word of the respective words matches a keyword of the first keywords. For example, if an electronic communication contains the text "Elizabeth Jennings fights Agent Gaad," and the first keywords include "Russia," "spy," and "Gaad," the media guidance application may determine that the word "Gaad" in the electronic communication matches the first keyword "Gaad."

In some embodiments, the media guidance application may further determine the first subset by adding, in response to determining that the word of the respective words matches the keyword of the first keywords, the respective electronic communication from which the respective words were derived to the first subset. For example, if an electronic communication contains the text "Elizabeth Jennings fights Agent Gaad," and a word of the text matches one of the first keywords, the media guidance application may add the electronic communication containing the text "Elizabeth Jennings fights Agent Gaad" to the first subset.

In some embodiments, the media guidance application may determine, based on the information regarding the respective time when each electronic communication in the first plurality of electronic communications was made available for the first user's viewing, a first availability time of a first electronic communication in the first subset that was made available for the first user's viewing earliest among other electronic communications in the first subset. For example, the media guidance application may sort the availability times of the first subset of electronic communications using any sorting algorithm, find the earliest availability time based on the sorting, and select as the first electronic communication the electronic communication having the earliest availability time.

In some embodiments, the media guidance application may calculate a first length of time from the second transmission time to the first availability time. For example, if the second transmission time is Wednesday, Feb. 4, 2015, at 8:00 pm Eastern Standard Time, and the first availability time is Thursday, Feb. 5, 2015, at 7:00 pm Eastern Standard Time, the media guidance application may calculate the first length of time to be 23 hours.

In some embodiments, the media guidance application may calculate a predicted time when the first user will be exposed to a spoiler of the first media asset based on the first length of time and the first transmission time. For example, the media guidance application may add the first length of time to the first transmission time to obtain the predicted time. For example, if the first transmission time is Wednesday, Feb. 11, 2015, at 8:00 pm Eastern Standard Time and the first length of time is 23 hours, the media guidance application may calculate the predicted time to be Thursday, Feb. 12, 2015, at 7:00 pm Eastern Standard Time.

In some embodiments, the media guidance application may generate a notification for the first user, where the notification indicates that the first user is predicted to be exposed to a spoiler of the first media asset at the predicted time. For example, the media guidance application may generate for display the predicted time on a display screen near a program listing for the first media asset. For example, the media guidance application may generate an audio or voice alert indicating the predicted time. For example, the media guidance application may send the first user an email or text message indicating the predicted time.

In some embodiments, retrieving, by the media guidance application, the first transmission time of the first media asset may include transmitting a request to a server for metadata associated with the first media asset. For example, the server may be a remote server hosting information about media assets, such as www.imdb.com. In some embodiments, the media guidance application may receive, from the server, based on the request, the metadata associated with the first media asset, where the metadata includes an indication of the first transmission time associated with the first media asset. For example, the first transmission time may be contained in a field containing release date information for the first media asset. In some embodiments, the media guidance application may extract, from the indication, the first transmission time. For example, the media guidance application may copy the first transmission time to memory.

In some embodiments, calculating, by the media guidance application, the predicted time when the first user will be exposed to a spoiler of the first media asset based on the first length of time and the first transmission time includes determining a second subset of the first plurality of electronic communications, where each electronic communication in the second subset references a third media asset, and where the third media asset has been initially released by way of simultaneous transmission to the plurality of viewers at a third transmission time that precedes the first transmission time, and where the third media asset was not previously simultaneously transmitted to the plurality of viewers prior to the third transmission time. For example, the third media asset may be an episode of a different television series from the television series of the first media asset and the third transmission time may be the air date of the episode. For example, if the first transmission time is Wednesday, Feb. 11, 2015, at 8:00 pm Eastern Standard Time, the third transmission time may be Saturday, Jan. 31, 2015, at 9:00 pm Eastern Standard Time, which precedes the first transmission time.

In some embodiments, the media guidance application may determine a second availability time of a second electronic communication in the second subset that was made available for the first user's viewing earliest among other electronic communications in the second subset. For example, the media guidance application may sort the availability times of the second subset of electronic communications using any sorting algorithm, find the earliest availability time based on the sorting, and select as the second electronic communication the electronic communication having the earliest availability time.

In some embodiments, the media guidance application may calculate a second length of time from the third transmission time to the second availability time. For example, if the third transmission time is Saturday, Jan. 31, 2015, at 9:00 pm Eastern Standard Time and the second availability time is Sunday, Feb. 1, 2015, at 6:00 pm Eastern Standard Time, the media guidance application may calculate the second length of time to be 21 hours.

In some embodiments, the media guidance application may calculate a first weighted sum by adding the first length of time weighted by a first weight and the second length of time weighted by a second weight. For example, if the first length of time is 23 hours and the second length of time is 21 hours, the media guidance application may assign weights of 0.5 to each length of time and calculate the first weighted sum to be (23 hours×0.5)+(21 hours×0.5)=22 hours.

In some embodiments, the media guidance application may add the first weighted sum to the first transmission time. For example, if the first transmission time is Wednesday, Feb. 11, 2015, at 8:00 pm Eastern Standard Time, and the first weighted sum 22 hours, the media guidance application may calculate the predicted time when the first user will be exposed to a spoiler of the first media asset to be Thursday, Feb. 12, 2015, at 6:00 pm Eastern Standard Time.

In some embodiments, calculating, by the media guidance application, the first weighted sum includes comparing second keywords to the first keywords, where the second keywords correspond to the first media asset and the first keywords correspond to the second media asset. In some embodiments, the media guidance application may determine a first relative number of keywords that overlap between the first keywords and the second keywords. For example, if the first keywords are "comedy" and "Knope" and the second keywords are "spy" and "Jennings," the media guidance application may calculate the first relative number of keywords to be zero because no words overlap between the first keywords and the second keywords. In some embodiments, the media guidance application may compare third keywords with the second keywords, where the third keywords correspond to the third media asset. In some embodiments, the media guidance application may determine a second relative number of keywords that overlap between the third keywords and the second keywords. For example, if the first keywords are "comedy" and "Knope" and the third keywords corresponding to the third media asset are "comedy" and "Cooper," the media guidance application may calculate the third relative number of keywords to be 1, because the keyword "comedy" overlaps between the second keywords and the third keywords. In some embodiments, the media guidance application may determine that the second relative number of keywords is greater than the first relative number of keywords. For example, if the second relative number of keywords is 1 and the first relative number of keywords is zero, the media guidance application may determine that the second relative number of keywords is greater than the first relative number of keywords. In some embodiments, based on determining that the second relative number of keywords is greater than the first relative number of keywords, the media guidance application may adjust the second weight to be greater than the first weight. For example, if the second weight and the first weight were both 0.5, the media guidance application may increase the second weight to 0.75 and decrease the first weight to 0.25.

In some embodiments, calculating, by the media guidance application, the predicted time when the first user will be exposed to a spoiler of the first media asset based on the first length of time and the first transmission time includes retrieving a second plurality of electronic communications transmitted from a third user, where the first user has viewed at least one of the second plurality of electronic communications. For example, the third user may be an individual, or a group of individuals, or an organization that is different from the second user. For example, the electronic communications may be text messages, emails, posts on social media networks, or articles on the internet. In some embodiments, the media guidance application may determine a third subset of the second plurality of electronic communications, where each electronic communication in the third subset references the second media asset. For example, the media guidance application may compare words from the second plurality of electronic communications to keywords corresponding to the second media asset. In some embodiments, the media guidance application may determine a third availability time of a third electronic communication in the third subset that was made available for the first user's viewing earliest among other electronic communications in the third subset. For example, the media guidance application may sort the availability times using any sorting algorithm, find the earliest availability time based on the sorting, and select as the third electronic communication the electronic communication having the earliest availability time. In some embodiments, the media guidance application may calculate a third length of time from the second transmission time to the third availability time. For example, if the second transmission time is Wednesday, Feb. 4, 2015, at 8:00 pm Eastern Standard Time and the third availability time is Thursday, Feb. 5, 2015, at 9:00 pm Eastern Standard, the third length of time may be calculated as 25 hours. In some embodiments, the media guidance application may calculate a second weighted sum by adding the first length of time weighted by a first weight and the third length of time weighted by a third weight. For example, if the first length of time is 23 hours and the third length of time is 25 hours, the media guidance application may assign weights of 0.5 to each length of time, and calculate the second weighted sum to be (23 hours×0.5)+(25 hours×0.5)=24 hours. In some embodiments, the media guidance application may add the second weighted sum to the first transmission time. For example, if the first transmission time is Wednesday, Feb. 11, 2015, at 8:00 pm Eastern, and the second weighted sum is 24 hours, the media guidance application may calculate the predicted time when the first user will be exposed to a spoiler of the first media asset to be Thursday, Feb. 12, 2015, at 8:00 pm Eastern Standard Time.

In some embodiments, calculating, by the media guidance application, the second weighted sum includes determining a first relative number of electronic communications in the first plurality of electronic communications transmitted from the second user that the first user viewed during a first period of time. In some embodiments, the media guidance application may calculate a first frequency by dividing the first relative number of electronic communications by the first period of time. For example, if the first user viewed 1 of the second user's electronic communications in 1 hour, the media guidance application may calculate the first frequency to be 1 electronic communication/hr. In some embodiments, the media guidance application may determine a second relative number of electronic communications in the second plurality of electronic communications transmitted from the third user that the first user viewed during a second period of time. In some embodiments, the media guidance application may calculate a second frequency by dividing the second relative number of electronic communications by the second period of time. For example, if the first user viewed 3 of the third user's electronic communications in 1 hour, the media guidance application may calculate the first frequency to be 3 electronic communications/hr. In some embodiments, the media guidance application may determine that the second frequency is greater than the first frequency. For example, if the second frequency is 3 electronic communications/hr and the first frequency is 1 electronic communication/hr, the media guidance application may determine that the second frequency is greater than the first frequency. In some embodiments, based on determining that the second frequency is greater than the first frequency, the media guidance application may adjust the third weight to be greater than the first weight. For example, if the first weight and the third weight are each 0.5, the media guidance application may increase the third weight to 0.75 and decrease the first weight to 0.25.

In some embodiments, calculating, by the media guidance application, the predicted time when the first user will be exposed to a spoiler of the first media asset based on the first length of time and the first transmission time includes selecting a fourth electronic communication from the first subset of the first plurality of electronic communications, where the fourth electronic communication has a fourth availability time and was made available for the first user's viewing latest among other electronic communications in the first subset. For example, the media guidance application may sort the availability times using any sorting algorithm, find the latest availability time based on the sorting, and select as the fourth electronic communication the electronic communication having the earliest availability time. In some embodiments, the media guidance application may calculate a fourth length of time from the second transmission time to the fourth availability time. For example, if the second transmission time is Wednesday, Feb. 4, 2015, at 8:00 pm Eastern Standard Time and the fourth availability time is Sunday, Feb. 8, 2015, at 8:00 pm Eastern Standard Time, the media guidance application may calculate the fourth length of time to be 4 days. In some embodiments, the media guidance application may calculate a third weighted sum by adding the first length of time weighted by a first weight and the fourth length of time weighted by a fourth weight. For example, if the first length of time is 23 hours and the fourth length of time is 4 days, the media guidance application may assign weights of 0.5 to each length of time, and calculate the third weighted sum to be (23 hours×0.5)+(4 days×0.5)= 59.5 hours. In some embodiments, the media guidance application may add the third weighted sum to the first transmission time. For example, if the first transmission time is Wednesday, Feb. 11, 2015, at 8:00 pm Eastern, and the third weighted sum is 59.5 hours, the media guidance application may calculate the predicted time when the first user will be exposed to a spoiler of the first media asset to be Saturday, Feb. 14, 2015, at 7:30 am Eastern Standard Time.

In some embodiments, calculating, by the media guidance application, the third weighted sum includes comparing words from the first electronic communication to fourth keywords, where the fourth keywords indicate spoilers. For example, the fourth keywords may include "spoil," "Oh," "believe," "surprise," "cliffhanger," and "dead." In some embodiments, the media guidance application may determine a first relative number of words from the first electronic communication that match the fourth keywords. For example, if the first electronic communication has the words "Watching The Americans with my wife," the media guidance application may calculate the first relative number of words to be zero, because no words in the first electronic communication match the fourth keywords. In some embodiments, the media guidance application may compare words from the fourth electronic communication to the fourth keywords. In some embodiments, the media guidance application may determine a second relative number of words from the fourth electronic communication that match the fourth keywords. For example, if the fourth electronic communication has the words "Oh my gosh I can't believe that Elizabeth beat up Gaad," the media guidance application may calculate the second relative number of words to be 2 because "Oh" and "believe" in the fourth electronic communication match the keywords corresponding to spoilers. In some embodiments, the media guidance application may determine that the second relative number is greater than the first relative number. For example, if the first relative number of keywords is 0 and the second relative number of keywords is 2, the media guidance application may determine that the second relative number of keywords is greater than the first relative number of keywords. In some embodiments, based on determining that the second relative number is greater than the first relative number, the media guidance application may adjust the fourth weight to be greater than the first weight. For example, if the first weight and the fourth weight are each 0.5, the media guidance application may increase the fourth weight to 0.75 and decrease the first weight to 0.25.

In some embodiments, the media guidance application may retrieve a plurality of media asset identifiers, each corresponding to one of a plurality of media assets that were released by way of simultaneous transmission to the plurality of viewers in the past, where the plurality of media assets comprises the first media asset. For example, the plurality of media assets may be media assets saved by a user for viewing later, or media assets saved automatically by the media guidance application based on user preferences. For example, the media asset identifiers may be titles of the plurality of media assets. In some embodiments, the media guidance application may calculate a plurality of predicted times, where each respective predicted time of the plurality of predicted times corresponds to a predicted time when the first user will be exposed to a spoiler of a respective media asset of the plurality of media assets. For example, the media guidance application may use any of the processes described herein for calculating the plurality of predicted times. In some embodiments, the media guidance application may generate a ranking of the plurality of media assets based on the plurality of predicted times. For example, the media guidance application may rank the media assets by predicted time of spoilage, from earliest predicted time to latest predicted time. In some embodiments, the media guidance application may generate for display the plurality of media asset identifiers in order based on the ranking of the plurality of media assets. For example, if the identifiers of the media assets are titles of the media assets, the media guidance application may generate for display the titles of the media assets in a list, with identifiers corresponding to media assets having earlier predicted times of spoilage displayed higher in the list than identifiers corresponding to media assets having later predicted times of spoilage.

In some embodiments, generating, by the media guidance application, the notification for the first user comprises retrieving a current time. For example, the media guidance application may retrieve the current time from a clock associated with a processor, or from a remote server, or from an internet-based clock. In some embodiments, the media guidance application may determine a fifth length of time from the current time to the predicted time. For example, if the predicted time is Thursday, Feb. 12, 2015, at 7:00 pm, and the current time is Thursday, Feb. 12, 2015, at 7:00 am, the media guidance application may calculate the fifth length of time from the current time to be 12 hours. In some embodiments, the media guidance application may compare the fifth length of time to a threshold length of time. In some embodiments, the media guidance application may determine that the fifth length of time is smaller than the threshold length of time. For example, if the threshold length of time is 14 hours, and the length of time from the current time to the predicted time of spoilage is 12 hours, the media guidance application may determine that the length of time is smaller than the threshold time. In some embodiments, based on determining that the fifth length of time is smaller than the threshold length of time, the media guidance application may generate the notification for the first user. For example, the media guidance application may generate for display the predicted time, or generate an audio or voice alert about the predicted time, or send a text message or email to the first user about the predicted time. For example, the media guidance application may not generate the notification for the first user unless the predicted time is smaller than the threshold time.

BRIEF DESCRIPTION OF THE DRAWINGS

FIG. 8 shows pseudocode for a process implemented on control circuitry to compare two values in accordance with some embodiments of the disclosure;

FIG. 10 shows pseudocode for a process implemented on control circuitry to count a number of words in a group that match entries of a database containing keywords in accordance with some embodiments of the disclosure.

DETAILED DESCRIPTION OF THE DRAWINGS

Figure 1:
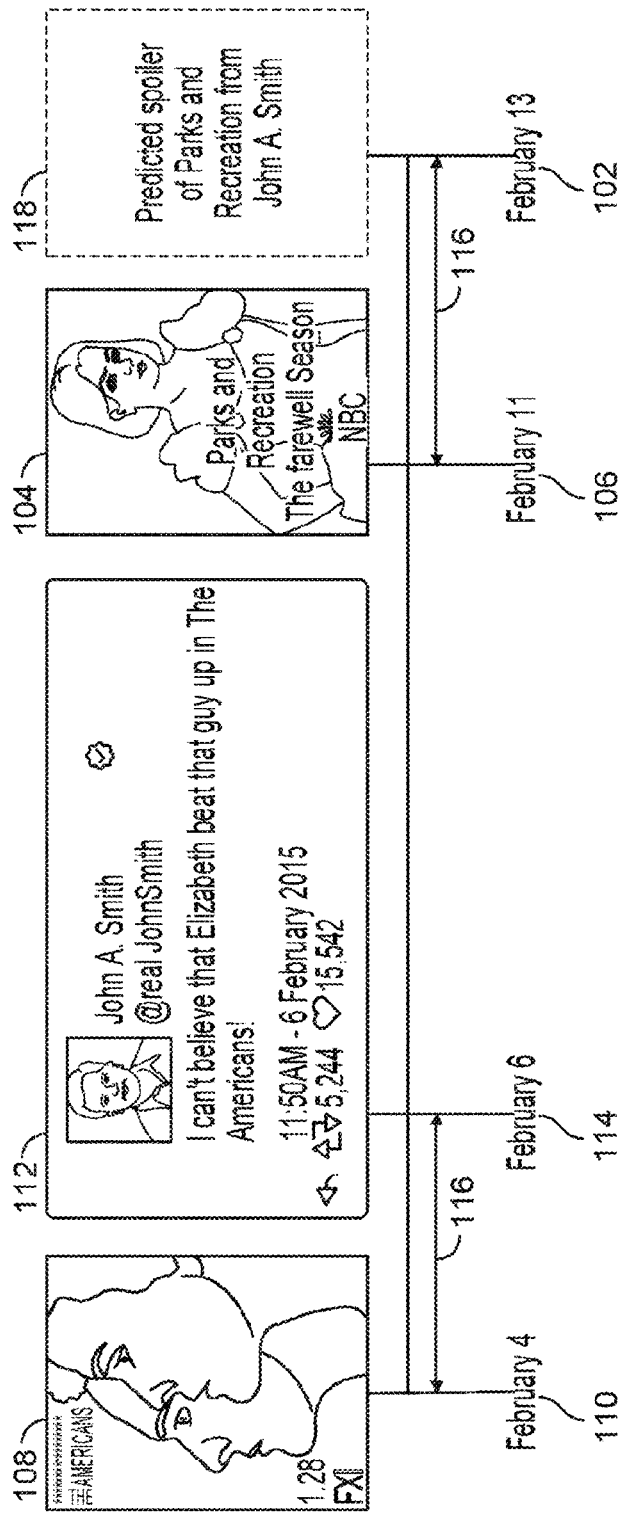
FIG. 1 shows an illustrative example of how to calculate a predicted time when a user will be exposed to a spoiler of a media asset, in accordance with some embodiments of the disclosure.

FIG. 1 shows an illustrative example of how to calculate a predicted time 102 when a first user will be exposed to a spoiler 118 of media asset 104. Media asset 104 has been transmitted for the first time at time 106. Media asset 108 has been transmitted for the first time at time 110, which precedes time 106. Electronic communication 112 was transmitted by a second user whose electronic communications the first user has viewed, and is the earliest electronic communication that the second user transmitted about media asset 108. Electronic communication 112 was transmitted at time 114. To calculate predicted time 102, a length of time 116 is calculated from time 110, when media asset 108 was transmitted, to time 114, when electronic communication 112 referencing media asset 108 was transmitted by the second user. Length of time 116 is added to time 106 to produce predicted time 102. By calculating the length of time 116 that it took the second user to transmit an electronic communication 112 about a previous media asset 108 for the first time after the previous media asset 108 was transmitted, it is possible for the media guidance application to predict that it will take the second user the same length of time 116 to transmit an electronic communication about the media asset in question, media asset 104, for the first time after media asset 104 is transmitted. Accordingly, the first electronic communication about media asset 104 from the second user can be expected at a time 102 that is the length of time 116 after the time 106 when media asset 104 has been transmitted. Because the first user views electronic communications transmitted by the second user, and because electronic communications may contain spoilers, this time 102 is the predicted time when the first user may be exposed to spoiler 118 about media asset 104.

While the above example describes analyzing an electronic communication about one previous media asset from one user, the procedure for calculating predicted time 102 can be extended to multiple users and multiple media assets. For example, it is possible to retrieve multiple earliest electronic communications 112 about media asset 108 where each of the multiple earliest electronic communications 112 is transmitted by one of multiple users, calculate lengths of time 116 for each of the multiple electronic communications 112, average together the lengths of time 116, and add the average of the lengths of time 116 to time 106 to produce predicted time 102. The multiple users may be, for example, friends of the first user, contacts of the first user, or members of the general population. The multiple electronic communications may be publicly available electronic communications from the general population, such as publicly available posts to a social networking site. For example, it is possible to retrieve multiple earliest electronic communications 112 about multiple media assets 108 where each of the multiple earliest electronic communications 112 is transmitted by the second user, calculate lengths of time 116 for each of the multiple electronic communications 112, average together the lengths of time 116, and add the average of the lengths of time 116 to time 106 to produce predicted time 102. Each of the multiple media assets 108 may be, for example, other episodes in the same television series as media asset 104. For example, it is possible to combine the above examples by retrieving multiple earliest electronic communications 112 about multiple media assets 108 transmitted by multiple users.

The following description will describe in more detail how to calculate a predicted time when a user, referred to here as user A, will be exposed to a spoiler of a media asset, referred to here as media asset 1 (corresponding to media asset 104 in FIG. 1). In some embodiments, the media guidance application may retrieve a transmission time, $t_1$ (corresponding to time 106 in FIG. 1), when media asset 1 was initially released by way of simultaneous transmission to a plurality of viewers, where media asset 1 was not previously simultaneously transmitted to the plurality of viewers prior to $t_1$. $t_1$ may comprise a year, month, day, hour, minute, second, and/or time zone, or any combination thereof. For example, media asset 1 may an episode of the television series Parks and Recreation, $t_1$ may be the original air date (e.g., Wednesday, Feb. 11, 2015, at 8:00 pm Eastern Standard Time) of media asset 1, and the plurality of viewers may be viewers of the television channel NBC, on which Parks and Recreation airs. In some embodiments in which media asset 1 is a movie, $t_1$ may be the date when media asset 1 is released in theaters and the plurality of viewers may be the general population who views movies in theaters. In some embodiments in which media asset 1 is internet media (e.g., an episode of a webseries), $t_1$ may be the date when media asset 1 is published on the internet and the plurality of viewers may be the general population who views internet media. In some embodiments in which media asset 1 is a television show on a subscription channel, the plurality of viewers may be the general population who views television shows on subscription channels.

In some embodiments, to retrieve $t_1$, the media guidance application may transmit a request to a server (e.g., media content source 516 and/or media guidance data source 518 as described below with respect to FIGS. 2-5, or another remote server) for metadata associated with media asset 1. In some embodiments, the media guidance application may receive, from the server, based on the request, the metadata associated with media asset 1. In some embodiments, the metadata may include an indication containing $t_1$. For example, the indication may be a release date field in the metadata. In some embodiments, the media guidance application may extract $t_1$ from the indication. In some embodiments, $t_1$ as extracted by the media guidance application may include a time (e.g., 8:00 pm Eastern Standard Time) in addition to a date (e.g., Wednesday, Feb. 11, 2015) of the initial transmission of media asset 1. In some embodiments, $t_1$ as extracted by the media guidance application may not include a time. In such embodiments, the media guidance application may transmit a request to a server (e.g., media content source 516, media guidance data source 518, and/or another remote server) to retrieve information about what time of day media asset 1 is typically scheduled to be broadcast and combine this information with the extracted date to determine $t_1$.

In some embodiments, to retrieve $t_1$, the media guidance application may receive media asset 1 from a server (e.g., media content source 516, media guidance data source 518, and/or another remote server) at $t_1$, and the media guidance application may also receive, along with media asset 1, metadata from the server containing an indication that media asset 1 is currently being transmitted to the plurality of viewers for the first time. In some embodiments, the media guidance application may select the current time as $t_1$.

In some embodiments, the media guidance application may retrieve a transmission time, $t_2$ (corresponding to time 110 in FIG. 1), of a second media asset, referred to here as media asset 2 (corresponding to media asset 108 in FIG. 1), that has been initially released by way of simultaneous transmission to a plurality of viewers at $t_2$, where media asset 2 was not previously simultaneously transmitted to the plurality of viewers prior to $t_2$, and where $t_2$ precedes the $t_1$ (the initial transmission time of media asset 1). For example, media asset 2 may be an episode of the television series The Americans, $t_2$ may be the original air date (e.g., Wednesday, Feb. 4, 2015, at 8:00 pm Eastern Standard Time) of media asset 2, and the plurality of viewers may be subscribers to the television channel FX, on which The Americans airs. In some embodiments in which media asset 2 is a movie, $t_2$ may be the date when media asset 2 is released in theaters and the plurality of viewers may be the general population who views movies in theaters. In some embodiments in which media asset 2 is internet media (e.g., an episode of a webseries), $t_2$ may be the date when media asset 2 is published on the internet and the plurality of viewers may be the general population who views internet media. In some embodiments in which media asset 2 is a television show on a broadcast channel, the plurality of viewers may be viewers of the broadcast channel. In some embodiments, the media guidance application may specifically select media asset 2 as an episode of the same television show as media asset 1. In some embodiments, the media guidance application may specifically select media asset 2 based on $t_2$ and $t_1$ being within a threshold amount of time of each other. As discussed above, $t_2$ precedes $t_1$. For example, if $t_1$ is Wednesday, Feb. 11, 2015, at 8:00 pm Eastern Standard Time, $t_2$ may be Wednesday, Feb. 4, 2015, at 8:00 pm Eastern Standard Time.

In some embodiments, to retrieve $t_2$, the media guidance application may transmit a request to a server (e.g., media content source 516, media guidance data source 518, and/or another remote server) for metadata associated with media asset 2. In some embodiments, the media guidance application may receive, from the server, based on the request, the metadata associated with media asset 2. In some embodiments, the metadata may include an indication of $t_2$. For example, the indication may be a release date field in the metadata. In some embodiments, the media guidance application may extract $t_2$ from the indication. In some embodiments, $t_2$ as extracted by the media guidance application may include a time (e.g., 8:00 pm Eastern Standard Time) in addition to a date (e.g., Wednesday, Feb. 4, 2015) of the initial transmission of media asset 2. In some embodiments, $t_2$ as extracted by the media guidance application may not include a time. In such embodiments, the media guidance application may transmit a request to a server (e.g., media content source 516, media guidance data source 518, and/or another remote server) to retrieve information about what time of day media asset 2 is typically scheduled to be broadcast and combine this information with the extracted date to determine $t_2$.

In some embodiments, the media guidance application may retrieve electronic communications, $E_B$, transmitted from another user (i.e., not user A), referred to here as user B, where user A has previously viewed at least one of the electronic communications in $E_B$. The electronic communications may be any form of communication transmitted through an electronic means. For example, the electronic communications may be electronic messages such as text messages and email. For example, the electronic communications may be social media posts, such as posts on social media websites such as Twitter and Facebook. For example, the electronic communications may be articles posted on the internet. User B may be any entity that transmits electronic communications. For example, user B may be an individual (e.g., a friend of user A), a group of individuals (e.g., a group of individuals contributing to a blog), or an organization (e.g., a news organization that publishes articles on the internet). In some embodiments, to determine that user A has viewed electronic communications in $E_B$, the media guidance application may retrieve information from a user profile associated with user A that contains an indication that user A views user B's electronic communications. In some embodiments, the user profile may be stored on a remote server or on storage (e.g., storage 408) of a user equipment device (e.g., user equipment device 400, user television equipment 502, user computer equipment 504, and/or wireless user communications device 506). In some embodiments, the media guidance application may retrieve information from user history associated with user A that contains an indication that user A has previously viewed user B's electronic communications. In some embodiments, the user history may be stored on a remote server or on storage (e.g., storage 408) of a user equipment device (e.g., user equipment device 400, user television equipment 502, user computer equipment 504, and/or wireless user communications device 506). In some embodiments, the media guidance application may monitor electronic communications viewed by user A with a user equipment device (e.g., user equipment device 400, user television equipment 502, user computer equipment 504, and/or wireless user communications device 506) and extract information about users who have transmitted electronic communications viewed by user A.

In some embodiments, to retrieve $E_B$ (the electronic communications transmitted by user B), the media guidance application may retrieve $E_B$ from a remote server. In some embodiments, the media guidance application may access a user equipment device that user B uses to transmit electronic communications and retrieve $E_B$ from that user equipment device. In some embodiments, the media guidance application may retrieve $E_B$ from a user equipment device (e.g., user equipment device 400, user television equipment 502, user computer equipment 504, and/or wireless user communications device 506) that user A uses to view electronic communications transmitted by user B. In some embodiments, to identify electronic communications transmitted by user B, the media guidance application may process metadata associated with the electronic communications and extract an identifier of user B from the metadata.

In some embodiments, the media guidance application may retrieve information regarding times when each electronic communication in $E_B$ was made available for user A's viewing. For example, the time when each electronic communication in $E_B$ was made available for user A's viewing may be the time when each electronic communication was transmitted from user B to user A (e.g., if the electronic communications are text messages or emails), the time when each electronic communication was posted to a social media network (e.g., if the electronic communications are social media posts), or the time when each electronic communication was published on the internet (e.g., if the electronic communications are news articles published on the internet). In some embodiments, the information may exist explicitly in entries of a database of associations between electronic communications and their availability times, and the media guidance application may retrieve the entries of the database. In some embodiments, the database may be stored on a remote server, on a user equipment device that user B uses to transmit electronic communications, or on a user equipment device (e.g., user equipment device 400, user television equipment 502, user computer equipment 504, and/or wireless user communications device 506) that user A uses to view electronic communications transmitted by user B. In some embodiments, the database may be stored at the same source as or a different source from the source from which the media guidance application retrieves $E_B$. In some embodiments, the media guidance application may process metadata associated with the electronic communications to retrieve the information regarding availability time. For example, metadata associated with text messages, emails, and social media posts may contain timestamps indicating when the text-messages, emails, and social media posts were transmitted/posted. In some embodiments, the media guidance application may process the electronic messages themselves to retrieve the information regarding availability time. For example, a news article may contain the publication date within the text of the article itself, and the media guidance application may extract the publication date from the article.

In some embodiments, the media guidance application may determine a subset $E_{B,2}$ of $E_B$, where each electronic communication in $E_{B,2}$ references media asset 2. In some embodiments, the media guidance application may determine which electronic communications in $E_B$ reference media asset 2 by comparing respective words from each respective electronic communication of $E_B$ with keywords corresponding to media asset 2. In some embodiments, the keywords may be actors, characters, directors, writers, plot details locations, an official hashtag associated with media asset 2, etc., corresponding to media asset 2. In some embodiments, the media guidance application may compare each word of each electronic communication to the keywords. In some embodiments, the media guidance application may compare groups of words from each electronic communication to the keywords. For example, if an electronic communication contains a first name and a last name (e.g., Philip Jennings) of a character in a television series, the media guidance application may compare the full name (e.g., Philip Jennings) to the keywords, rather than comparing the first name (e.g., Philip) and the last name (e.g., Jennings) individually to the keywords. In some embodiments, the media guidance application may use natural language processing techniques to determine which words or groups of words to compare to the keywords. For example, the natural language processing techniques may identify certain words having a higher importance (e.g., names) than other words (e.g., "the," "and," etc.). In some embodiments, the media guidance application may compare different combinations of groups of words to the keywords (e.g., the media guidance application may compare "Philip," "Jennings," and "Philip Jennings") to the keywords. In some embodiments, the media guidance application may retrieve the keywords from entries of a database stored on a remote server. In some embodiments, the media guidance application may retrieve the entries of the database from storage (e.g., storage 408) of a user equipment device (e.g., user equipment device 400, user television equipment 502, user computer equipment 504, and/or wireless user communications device 506). In some embodiments, the media guidance application may retrieve the entries of the database from a server (e.g., media content source 516, media guidance data source 518, and/or another remote server). In some embodiments, the media guidance application may generate the database by searching for keywords that correspond to media asset 2. In some embodiments, the media guidance application may search the internet, a server (e.g., media content source 516, media guidance data source 518, and/or another remote server) and/or a user equipment device (e.g., user equipment device 400, user television equipment 502, user computer equipment 504, and/or wireless user communications device 506) for the keywords.

In some embodiments, the media guidance application may further determine $E_{B,2}$ by determining that a word or a group of words from an electronic communication in $E_B$ matches one or more of the keywords, and in response to determining that the word matches one of the keywords, add the respective electronic communication from which the word was derived to $E_{B,2}$. For example, the electronic communication may contain the text "Elizabeth Jennings fights Agent Gaad." The keywords may be associated with the television series The Americans and include "Russia," "spy," and "Gaad" (characters and plot details in the television show The Americans). The media guidance application may determine that "Gaad" in the electronic communication matches the keyword "Gaad" and add the electronic communication to $E_{B,2}$. In some embodiments, the media guidance application adds each electronic communication having a word that matches a keyword to $E_{B,2}$. In some embodiments, the media guidance application may use the processes depicted in FIGS. 9 and 10 to perform keyword comparisons.

In some embodiments, the media guidance application may determine, based on the information regarding the respective time when each electronic communication in $E_B$ was made available for user A's viewing, the earliest availability time $t_{B,2}$ (corresponding to time 114 in FIG. 1) of an electronic communication (corresponding to electronic communication 112 in FIG. 1) in $E_{B,2}$ among other electronic communications in $E_{B,2}$. For example, if $E_{B,2}$ contains three electronic communications, and the information regarding availability times indicates that the electronic communications were made available at (1) Thursday, Feb. 5, 2015, at 7:00 pm Eastern Standard Time, (2) Friday, Feb. 6, 2015, at 8:00 pm Eastern Standard Time, and (3) Saturday, Feb. 7, 2015, at 8:00 pm Eastern Standard Time, the media guidance application may select the electronic communication with the availability time of Thursday, Feb. 5, 2015, at 7:00 pm Eastern Standard Time as the electronic communication with the earliest availability time. To determine the electronic communication with the earliest availability time, the media guidance application may use any sorting algorithm, such as insertion sort, selection sort, merge sort, heapsort, quicksort, bubble sort, shellsort, comb sort, counting sort, bucket sort, and radix sort.

In some embodiments, the media guidance application may calculate a length of time $t_{2-B,2}$ (corresponding to length of time 116 in FIG. 1) from $t_2$ (the initial transmission time of media asset 2) to $t_{B,2}$. $t_{2-B,2}$ represents the time from the initial transmission of media asset 2 to user B's earliest electronic communication about media asset 2. In some embodiments, the media guidance application may perform subtraction operations to calculate $t_{2-B,2}$. For example, if $t_2$ is Wednesday, Feb. 4, 2015, at 8:00 pm Eastern Standard Time and $t_{B,2}$ is Thursday, Feb. 5, 2015, at 7:00 pm Eastern Standard Time, $t_{2-B,2}$ may be calculated as $t_{2-B,2}=t_{B,2}-t_2=23$ hours. In some embodiments, the media guidance application may round $t_{2-B,2}$ to the nearest second, minute, hour, day, week, month, etc. In some embodiments, the media guidance application may round $t_{2-B,2}$ to the preceding second, minute, hour, day, week, month, etc.

In some embodiments, the media guidance application may calculate a predicted time $t_{P,1}$ (corresponding to time 102 in FIG. 1) when user A will be exposed to a spoiler (corresponding to spoiler 118 in FIG. 1) of media asset 1 based on $t_{2-B,2}$ and $t_1$ (the initial transmission time of media asset 1). In some embodiments, the media guidance application may add $t_{2-B,2}$ to $t_1$ in order to obtain $t_{P,1}$. For example, if $t_1$ is Wednesday, Feb. 11, 2015, at 8:00 pm Eastern Standard Time and $t_{2-B,2}$ is 23 hours, the media guidance application may calculate $t_{P,1}$ as $t_{P,1}=t_1+t_{2-B,2}=$ Thursday, Feb. 12, 2015, at 7:00 pm Eastern Standard Time.

By identifying another user, user B, whose electronic communications user A has viewed, the media guidance application can identify a user whose electronic communications user A may view in the future and that could contain spoilers of media asset 1. By calculating a length of time between the transmission time of a previous media asset and the availability time of the earliest electronic communication transmitted by a second user corresponding to the previous media asset, the media guidance application can determine how long it previously took user B to transmit an electronic communication about the previous media asset. This length of time can be an estimate for how long it may take for user B to transmit an electronic communication about media asset 1 after the transmission time of media asset 1. Because these electronic communications may contain spoilers of the media asset 1, and because user A may view these electronic communications, adding this length of time to the transmission time of media asset 1 may provide an estimate for the earliest time when user A may view spoilers of media asset 1 in user B's electronic communications.

As discussed above, the media guidance application may calculate $t_{P,1}$ (the predicted time when user A will be exposed to a spoiler of media asset 1) by determining how long it previously took user B to transmit an electronic communication about media asset 2 after $t_2$ (the transmission time of media asset 2), and estimating that it will take user B this same amount of time to transmit an electronic communication about media asset 1 after $t_1$ (the transmission time of media asset 1). Because the above calculations depend on the activity of B relative to the transmission times of media asset 1 and media asset 2, in some embodiments, the media guidance application may determine $t_1$ and $t_2$ as the times when media asset 1 and media asset 2, respectively, have been initially released by way of simultaneous transmission to a plurality of viewers in the time zone of user B, where media asset 1 and media asset 2 were not previously simultaneously transmitted to the plurality of viewers in the time zone of user B prior to $t_1$ and $t_2$, respectively In such embodiments, $t_1$ and $t_2$ may vary depending on the time zone in which user B is located. For example, if user B is located in the Eastern Time Zone, $t_1$ may be three hours earlier than if user B is located in the Pacific Time Zone, because media asset 1 may air for the first time in the Eastern Time Zone three hours before it airs for the first time in the Pacific Time Zone.

If media asset 1 is transmitted in the time zone of user A after it is transmitted in the time zone of user B, $t_{P,1}$ may precede the transmission time of media asset 1 in the time zone of user A. For example, the media guidance application may calculate $t_{2-B,2}$ (the time from the initial transmission of media asset 2 to user B's earliest electronic communication about media asset 2) to be 2 hours. If user B is in the Eastern Time Zone, and $t_1$ (the time when media asset 1 is transmitted in the Eastern Time Zone) is Wednesday, Feb. 11, 2015, at 8:00 pm Eastern Standard Time, the media guidance application may calculate $t_{P,1}$ as $t_{P,1}=t_1+t_{2-B,2}=$ Wednesday, Feb. 11, 2015, at 10:00 pm Eastern Standard Time. However, if user A is in the Pacific Time Zone, media asset 1 may not be transmitted until 3 hours after $t_1$, on Wednesday, Feb. 11, 2015, at 8:00 pm Pacific Standard Time, equivalent to Wednesday, Feb. 11, 2015, at 11:00 pm Eastern Standard Time. Thus, the transmission time of media asset 1 in user A's time zone is after the predicted time of spoilage of media asset 1 for user A. This reflects the risk that because media asset 1 is transmitted in user B's time zone before it is transmitted in user A's time zone, user B may have the opportunity to transmit electronic communications containing spoilers of media asset 1 before media asset 1 has been transmitted in user A's time zone, and before user A may have the opportunity to view media asset 1. As will be discussed below, the media guidance application may use a different method for notifying the user of the predicted time of spoilage of media asset 1 if the predicted time precedes the transmission time of media asset in user A's time zone.

In some embodiments, the media guidance application may calculate the predicted time, $t_{P,1}$, when user A will be exposed to a spoiler of media asset 1, using data from a third media asset, besides media asset 2. In some embodiments, the media guidance application may retrieve a transmission time, $t_3$, of a third media asset, referred to here as media asset 3, that has been initially released by way of simultaneous transmission to a plurality of viewers at $t_3$, where media asset 3 was not previously simultaneously transmitted to the plurality of viewers prior to $t_3$. For example, media asset 3 may be an episode of the television series The Big Bang Theory, $t_3$ may be the original air date (e.g., Saturday, Jan. 31, 2015, at 9:00 pm Eastern Standard Time) of media asset 3, and the plurality of viewers may be viewers of the television channel CBS, on which The Big Bang Theory airs. In some embodiments in which media asset 3 is a movie, $t_3$ may be the date when media asset 3 is released in theaters and the plurality of viewers may be the general population who views movies in theaters. In some embodiments in which media asset 3 is internet media (e.g., an episode of a webseries), $t_3$ may be the date when media asset 3 is published on the internet and the plurality of viewers may be the general population who views internet media. In some embodiments in which media asset 3 is a television show on a subscription channel, the plurality of viewers may be subscribers to the channel. In some embodiments, the media guidance application may specifically select media asset 3 as an episode of the same television series as media asset 1. In some embodiments, the media guidance application may specifically select media asset 3 based on $t_3$ and $t_1$ being within a threshold amount of time of each other. As discussed above, $t_3$ precedes $t_1$. For example, if $t_1$ is Wednesday, Feb. 11, 2015, at 8:00 pm Eastern Standard Time, $t_3$ may be Saturday, Jan. 31, 2015, at 9:00 pm Eastern Standard Time.

In some embodiments, to retrieve $t_3$, the media guidance application may transmit a request to a server (e.g., media content source 516, media guidance data source 518, and/or another remote server) for metadata associated with media asset 3. In some embodiments, the media guidance application may receive, from the server, based on the request, the metadata associated with media asset 3. In some embodiments, the metadata may comprise an indication of $t_3$. For example, the indication may be a release date field in the metadata. In some embodiments, the media guidance application may extract $t_3$ from the indication. In some embodiments, $t_3$ as extracted by the media guidance application may include a time (e.g., 9:00 pm Eastern Standard Time) in addition to a date (e.g., Saturday, Jan. 31, 2015) of the initial transmission of media asset 3. In some embodiments, $t_3$ as extracted by the media guidance application does not include a time. In such embodiments, the media guidance application may transmit a request to a server (e.g., media content source 516, media guidance data source 518, and/or another remote server) to retrieve information about what time of day media asset 3 is typically scheduled to be broadcast and combine this information with the extracted date to determine $t_3$.

In some embodiments, the media guidance application may determine a subset $E_{B,3}$ of the electronic communications $E_B$ transmitted by user B, where each electronic communication in $E_{B,3}$ references media asset 3. In some embodiments, the keywords may be actors, characters, directors, writers, plot details locations, an official hashtag associated with media asset 3, etc., corresponding to media asset 3. In some embodiments, the media guidance application may determine which electronic communications in $E_B$ reference media asset 3 by comparing respective words from each respective electronic communication of $E_B$ with keywords corresponding to media asset 3. In some embodiments, the media guidance application may compare each word of each electronic communication in $E_B$ to the keywords. In some embodiments, the media guidance application may compare groups of words from each electronic communication to the keywords. For example, if an electronic communication contains a first name and a last name (e.g., Sheldon Cooper) of a character in a television series, the media guidance application may compare the full name (e.g., Sheldon Cooper) to the keywords, rather than comparing the first name (e.g., Sheldon) and the last name (e.g., Cooper) individually to the keywords. In some embodiments, the media guidance application may use natural language processing techniques to determine which words or groups of words to compare to the keywords. For example, the natural language processing techniques may identify certain words having a higher importance (e.g., names) than other words (e.g., "the," "and," etc.). In some embodiments, the media guidance application may compare different combinations of groups of words to the keywords (e.g., the media guidance application may compare "Sheldon," "Cooper," and "Sheldon Cooper") to the keywords. In some embodiments, the media guidance application may retrieve the keyword from entries of a database stored on a remote server. In some embodiments, the media guidance application may retrieve the entries of the database from storage (e.g., storage 408) of a user equipment device (e.g., user equipment device 400, user television equipment 502, user computer equipment 504, and/or wireless user communications device 506). In some embodiments, the media guidance application may retrieve the entries of the database from a server (e.g., media content source 516, media guidance data source 518, and/or another remote server). In some embodiments, the media guidance application may generate the database by searching for keywords that correspond to media asset 3. In some embodiments, the media guidance application may search the internet, a server (e.g., media content source 516, media guidance data source 518, and/or another remote server), and/or a user equipment device (e.g., user equipment device 400, user television equipment 502, user computer equipment 504, and/or wireless user communications device 506), for the keywords.

In some embodiments, the media guidance application may further determine $E_{B,3}$ by determining that a word or a group of words from an electronic communication in $E_B$ matches one or more of the keywords, and in response to determining that the word matches one of the keywords, add the respective electronic communication from which the word was derived to $E_{B,3}$. For example, the electronic communication may contain the text "Sheldon gets married." The keywords may be associated with the television series The Big Bang Theory and include "Sheldon," "Cooper," "Penny," and "Amy" (names of characters in The Big Bang Theory). The media guidance application may determine that "Sheldon" in the electronic communication matches the keyword "Sheldon" and add the electronic communication to $E_{B,3}$. In some embodiments, the media guidance application adds each electronic communication having a word that matches a keyword to $E_{B,3}$. In some embodiments, the media guidance application may use the processes depicted in FIGS. 9 and 10 to perform keyword comparisons.

In some embodiments, the media guidance application may determine, based on the information regarding the respective time when each electronic communication in $E_B$ was made available for user A's viewing, the earliest availability time $t_{B,3}$ of an electronic communication in $E_{B,3}$ among other electronic communications in $E_{B,3}$. For example, if $E_{B,3}$ contains three electronic communications, and the information regarding availability times indicates that the electronic communications were made available at (1) Sunday, Feb. 1, 2015, at 6:00 pm Eastern Standard Time, (2) Monday, Feb. 2, 2015, at 8:00 pm Eastern Standard Time, and (3) Tuesday, Feb. 3, 2015, at 8:00 pm Eastern Standard Time, the media guidance application may select the electronic communication with the availability time of Sunday, Feb. 1, 2015, at 6:00 pm Eastern Standard Time as the electronic communication with the earliest availability time. To determine the electronic communication with the earliest availability time, the media guidance application may use any sorting algorithm, such as insertion sort, selection sort, merge sort, heapsort, quicksort, bubble sort, shellsort, comb sort, counting sort, bucket sort, and radix sort.

In some embodiments, the media guidance application may calculate a length of time $t_{3-B,3}$ from $t_3$ (the initial transmission time of media asset 3) to $t_{B,3}$. In some embodiments, the media guidance application may perform subtraction operations to calculate $t_{3-B,3}$. For example, if $t_3$ is Saturday, Jan. 31, 2015, at 9:00 pm Eastern Standard Time and $t_{B,3}$ is Sunday, Feb. 1, 2015, at 6:00 pm Eastern Standard Time, $t_{3-B,3}$ may be calculated as $t_{3-B,3}=t_{B,3}-t_3=21$ hours. $t_{3-B,3}$ represents the time from the initial transmission of media asset 3 to user B's earliest electronic communication about media asset 3. In some embodiments, the media guidance application may round $t_{3-B,3}$ to the nearest second, minute, hour, day, week, month, etc. In some embodiments, the media guidance application may round $t_{3-B,3}$ to the preceding second, minute, hour, day, week, month, etc.

In some embodiments, the media guidance application may calculate a weighted sum $t_{B,23}$ including $t_{2-B,23}$ weighted by a weight $W_{2-B,2}$ and $t_{3-B,3}$ weighted by a weight $W_{3-B,3}$. In some embodiments, $t_{B,23}=(t_{2-B,2} \times W_{2-B,2})-(t_{3-B,3} \times W_{3-B,3})$. For example, if $t_{2-B,2}$ is 23 hours and $t_{3-B,3}$ is 21 hours, the media guidance application may assign weights of 0.5 to each length of time, and calculate $t_{B,23}$ as (23 hours×0.5)+(21 hours×0.5)=22 hours. In some embodiments, the media guidance application assigns equal weights to components of the weighted sum $t_{B,23}$ by default.

In some embodiments, the media guidance application may calculate the predicted time, $t_{P,1}$, when user A will be exposed to a spoiler of media asset 1 by adding the weighted sum $t_{B,23}$ to $t_1$ (the initial transmission time of media asset 1). If $t_1$ is Wednesday, Feb. 11, 2015, at 8:00 pm Eastern Standard Time, and $t_{B,23}$ is 22 hours, the media guidance application may calculate $t_{P,1}$ as Thursday, Feb. 12, 2015, at 6:00 pm Eastern Standard Time.

Calculating the predicted time when user A will be exposed to a spoiler of media asset 1 using data about user B's earliest electronic communications about two different media assets can be helpful in providing a more accurate predicted time. For example, user B may transmit electronic communications about media asset 2 much earlier/later after the transmission time of media asset that user B typically transmits electronic communications about other media assets. Calculating the predicted time just based on data from media asset 2 could give an inaccurately early/late predicted time. Incorporating data into the weighted sum from media asset 3, which may more closely represent user B's typical habits for transmitting electronic communication, can help to provide a more accurate prediction.

In some embodiments, the media guidance application may calculate a weighted sum by analyzing multiple media assets (e.g., more than two) using the processes described above. In some embodiments, the media guidance application may retrieve multiple electronic communications transmitted by user B where each of the electronic communications is the earliest electronic communication transmitted by user B about a different media asset, calculate multiple lengths of time ($t_{2-B,2}$, $t_{3-B,3}$, etc.) for each of the multiple electronic communications, calculate a weighted sum of the multiple lengths of time, and add the weighted sum to $t_1$ to calculate $t_{P,1}$. In some embodiments, the multiple media assets may be other episodes in the same television series as media asset 1. For example, if media asset 1 is season 3 episode 3 of The Americans, the multiple media assets may be other episodes from season 3 and/or other seasons of The Americans.

In some embodiments, the media guidance application may adjust the weights $W_{2-B,2}$ and $W_{3-B,3}$ based on how similar each of media asset 2 and media asset 3 is to media asset 1. In some embodiments, the media guidance application may compare keywords corresponding to media asset 2 with keywords that correspond to media asset 1. In some embodiments, the media guidance application may determine a number of keywords $K_{1,2}$ that overlap between the keywords corresponding to media asset 1 and the keywords corresponding to media asset 2. In some embodiments, the media guidance application may compare keywords corresponding to media asset 3 with the keywords that correspond to media asset 1. In some embodiments, the media guidance application may determine a number of keywords $K_{1,3}$ that overlap between the keywords corresponding to media asset 1 and the keywords corresponding to media asset 3. For example, if the keywords corresponding to media asset 1 are "comedy" and "Knope," the keywords corresponding to media asset 2 are "spy" and "Jennings," and the keywords corresponding to media asset 3 are "comedy" and "Cooper," the media guidance application may calculate $K_{1,3}$ to be 1 (because the keyword "comedy" overlaps between media asset 1 and media asset 3) and calculate $K_{1,2}$ to be zero (because no words overlap between the keywords of media asset 1 and media asset 2). In some embodiments, the media guidance application may use the process depicted in FIGS. 9 and 10 to perform these comparisons. In some embodiments, the media guidance application may determine that $K_{1,3}$ is greater than $K_{1,2}$. This may indicate that media asset 3 is more similar to media asset 1 than media asset 2 is. In some embodiments, based on determining that $K_{1,3}$ is greater than $K_{1,2}$, the media guidance application may adjust $W_{3-B,3}$ to be greater than $W_{2-B,2}$. For example, the media guidance application may increase $W_{3-B,3}$ and/or decrease $W_{2-B,2}$ such that the ratio between $W_{3-B,3}$ and $W_{2-3,2}$ is the same as the ratio between $K_{1,3}$ and $K_{1,2}$. For example, if $K_{1,3}$ is 3 and $K_{1,2}$ is 1, the ratio between $K_{1,3}$ and $K_{1,2}$ is 3. Accordingly, the media guidance application may adjust $W_{3-B,3}$ to be 0.75 and adjust $W_{2-B,2}$ to be 0.25 (e.g., from their default values of 0.5 and 0.5) such that the ratio between $W_{3-B,3}$ and $W_{2-B,2}$ is 3. In some embodiments, the media guidance application may only adjust the weights $W_{3-B,3}$ and $W_{2-B,2}$ if $K_{1,3}$ is a threshold amount greater than $K_{1,2}$. In some embodiments, based on determining that $K_{1,3}$ is greater than $K_{1,2}$, the media guidance application may increase and/or decrease $W_{3-B,3}$ and $W_{2-B,2}$ by fixed amounts and/or proportions. In some embodiments, the keywords corresponding to media asset 1 and/or the keywords corresponding to media asset 2 and/or the keywords corresponding to media asset 3 may be stored in different databases.

Calculating overlap of keywords between media asset 2/media asset 3 and media asset 1 can be helpful in determining similarity between media asset 2/media asset 3 and media asset 1. Determining similarity between media asset 2/media asset 3 and media asset 1 may be helpful because, if user B transmits an electronic communication that contains a spoiler about a media asset, user B may be more likely to transmit an electronic communication that contains a spoiler about a similar media asset than to transmit an electronic communication that contains a spoiler about a disparate media asset. For example, if user B transmits an electronic communication containing a spoiler about a comedy television show, user B may be more likely to transmit an electronic communication containing a spoiler about another comedy television show than to transmit an electronic communication containing a spoiler about a spy television show, because, for example, user B may be more inclined to transmit electronic communications about comedy shows than spy shows, or may be more likely to watch comedy shows than spy shows. For example, if user B transmits an electronic communication containing a spoiler about a previous episode of a television show, user B may be more likely to transmit an electronic communication containing a spoiler about a subsequent episode from the same show than to transmit an electronic communication containing a spoiler about a different show.

In some embodiments, the media guidance application may calculate the predicted time, $t_{P,1}$, when user A will be exposed to a spoiler of media asset 1, using data from a third user, besides user B. In some embodiments, the media guidance application may retrieve electronic communications $E_C$ transmitted from a third user, user C, where user A has previously viewed at least one of the electronic communications in $E_C$. The electronic communications may be any form of communication transmitted through an electronic means. For example, the electronic communications may be electronic messages such as text messages and email. For example, the electronic communications may be social media posts, such as posts on social media websites such as Twitter and Facebook. For example, the electronic communications may be articles posted on the internet. User C may be any entity that transmits electronic communications. For example, user B may be an individual (e.g., a friend of user A), a group of individuals (e.g., a group of individuals contributing to a blog), or an organization (e.g., a news organization that publishes articles on the internet). In some embodiments, to determine that user A has viewed electronic communications in $E_C$, the media guidance application may retrieve information from a user profile associated with user C that contains an indication that user A views user C's electronic communications. In some embodiments, the user profile may be stored on a remote server or on storage (e.g., storage 408) of a user equipment device (e.g., user equipment device 400, user television equipment 502, user computer equipment 504, and/or wireless user communications device 506). In some embodiments, the media guidance application may retrieve information from user history associated with user A that contains an indication that user A has previously viewed user C's electronic communications. In some embodiments, the user history may be stored on a remote server or on storage (e.g., storage 408) of a user equipment device (e.g., user equipment device 400, user television equipment 502, user computer equipment 504, and/or wireless user communications device 506). In some embodiments, the media guidance application may monitor electronic communications viewed by user A with a user equipment device (e.g., user equipment device 400, user television equipment 502, user computer equipment 504, and/or wireless user communications device 506) and extract information about users who have transmitted electronic communications viewed by user A.

In some embodiments, to retrieve $E_C$ (the electronic communications transmitted by user C), the media guidance application may retrieve $E_C$ from a remote server. In some embodiments, the media guidance application may access a user equipment device that user C uses to transmit electronic communications and retrieve $E_C$ from that user equipment device. In some embodiments, the media guidance application may retrieve $E_C$ from a user equipment device (e.g., user equipment device 400, user television equipment 502, user computer equipment 504, and/or wireless user communications device 506) that user A uses to view electronic communications transmitted by user C. In some embodiments, to identify electronic communications transmitted by user C, the media guidance application may process metadata associated with the electronic communications and extract an identifier of user C from the metadata.

In some embodiments, the media guidance application may retrieve information regarding times when each electronic communication in $E_C$ was made available for user A's viewing. For example, the time when each electronic communication in $E_C$ was made available for user A's viewing may be the time when each electronic communication was transmitted from user C to user A (e.g., if the electronic communications are text messages or emails), the time when each electronic communication was posted to a social media network (e.g., if the electronic communications are social media posts), or the time when each electronic communication was published on the internet (e.g., if the electronic communications are news articles published on the internet). In some embodiments, the information may exist explicitly in entries of a database of associations between electronic communications and their availability times, and the media guidance application may retrieve the entries of the database. In some embodiments, the database may be stored on a remote server, on a user equipment device that user C uses to transmit electronic communications, or on a user equipment device (e.g., user equipment device 400, user television equipment 502, user computer equipment 504, and/or wireless user communications device 506) that user A uses to view electronic communications transmitted by user C. In some embodiments, the database may be stored at the same source as or a different source from the source from which the media guidance application retrieves $E_C$. In some embodiments, the media guidance application may process metadata associated with the electronic communications to retrieve the information regarding availability time. For example, metadata associated with text messages, emails, and social media posts may contain timestamps indicating when the text-messages, emails, and social media posts were transmitted/posted. In some embodiments, the media guidance application may process the electronic messages themselves to retrieve the information regarding availability time. For example, a news article may contain the publication date within the text of the article itself, and the media guidance application may extract the publication date from the article.

In some embodiments, the media guidance application may determine a subset $E_{C,2}$ of $E_C$, where each electronic communication in $E_{C,2}$ references media asset 2. In some embodiments, the media guidance application may determine which electronic communications in $E_C$ reference media asset 2 by comparing respective words from each respective electronic communication of $E_C$ with keywords corresponding to media asset 2. In some embodiments, the media guidance application may compare each word of each electronic communication to the keywords. In some embodiments, the media guidance application may compare groups of words from each electronic communication to the keywords. For example, if an electronic communication contains a first name and a last name (e.g., Philip Jennings) of a character in a television series, the media guidance application may compare the full name (e.g., Philip Jennings) to the keywords, rather than comparing the first name (e.g., Philip) and the last name (e.g., Jennings) individually to the keywords. In some embodiments, the media guidance application may use natural language processing techniques to determine which words or groups of words to compare to the keywords. For example, the natural language processing techniques may identify certain words having a higher importance (e.g., names) than other words (e.g., "the," "and," etc.). In some embodiments, the media guidance application may compare different combinations of groups of words to the keywords (e.g., the media guidance application may compare "Philip," "Jennings," and "Philip Jennings") to the keywords. In some embodiments, the media guidance application may retrieve the keyword from a database stored on a remote server. In some embodiments, the media guidance application may retrieve the entries of the database from storage (e.g., storage 408) of a user equipment device (e.g., user equipment device 400, user television equipment 502, user computer equipment 504, and/or wireless user communications device 506). In some embodiments, the media guidance application may retrieve the entries of the database from a server (e.g., media content source 516, media guidance data source 518, and/or a remote server). In some embodiments, the media guidance application may generate the database by searching for keywords that correspond to media asset 2. In some embodiments, the media guidance application may search the internet, a server (e.g., media content source 516, media guidance data source 518, and/or another remote server), and/or a user equipment device (e.g., user equipment device 400, user television equipment 502, user computer equipment 504, and/or wireless user communications device 506) for the keywords.

In some embodiments, the media guidance application may further determine $E_{C,2}$ by determining that a word or a group of words from an electronic communication in $E_C$ matches one or more of the keywords, and in response to determining that the word matches one of the keywords, add the respective electronic communication from which the word was derived to $E_{C,2}$. For example, the electronic communication may contain the text "Elizabeth Jennings fights Agent Gaad." The keywords may be associated with the television series The Americans and include "Russia," "spy," "Jennings," and "Gaad" (plot details and names of characters in the Americans). The media guidance application may determine that "Gaad" in the electronic communication matches the keyword "Gaad" and add the electronic communication to $E_{C,2}$. In some embodiments, the media guidance application adds each electronic communication having a word that matches a keyword to $E_{C,2}$. In some embodiments, the media guidance application may use the processes depicted in FIGS. 9 and 10 to perform keyword comparisons.

In some embodiments, the media guidance application may determine, based on the information regarding the respective time when each electronic communication in $E_C$ was made available for user A's viewing, the earliest availability time $t_{C,2}$ of an electronic communication in $E_{C,2}$ among other electronic communications in $E_{C,2}$. For example, if $E_{C,2}$ contains three electronic communications, and the information regarding availability times indicates that the electronic communications were made available at (1) Thursday, Feb. 5, 2015, at 9:00 pm Eastern Standard Time, (2) Friday, Feb. 6, 2015, at 8:00 pm Eastern Standard Time, and (3) Saturday, Feb. 7, 2015, at 8:00 pm Eastern Standard Time, the media guidance application may select the electronic communication with the availability time of Thursday, Feb. 5, 2015, at 9:00 pm Eastern Standard as the electronic communication with the earliest availability time. To determine the electronic communication with the earliest availability time, the media guidance application may use any sorting algorithm, such as insertion sort, selection sort, merge sort, heapsort, quicksort, bubble sort, shellsort, comb sort, counting sort, bucket sort, and radix sort.

In some embodiments, the media guidance application may calculate a length of time $t_{2-C,2}$ from $t_2$ (the initial transmission time of media asset 2) to $t_{C,2}$. In some embodiments, the media guidance application may perform subtraction operations to calculate $t_{2-C,2}$. For example, if $t_2$ is Wednesday, Feb. 4, 2015, at 8:00 pm Eastern Standard Time and $t_{C,2}$ is Thursday, Feb. 5, 2015, at 9:00 pm Eastern Standard, the media guidance application may calculate $t_{2-C,2}$ as $t_{2-C,2}=t_{C,2}-t_2=25$ hours. $t_{2-C,2}$ represents the time from the initial transmission of media asset 2 to user C's earliest electronic communication about media asset 2. In some embodiments, the media guidance application may round $t_{2-C,2}$ to the nearest second, minute, hour, day, week, month, etc. In some embodiments, the media guidance application may round $t_{2-C,2}$ to the preceding second, minute, hour, day, week, month, etc.

In some embodiments, the media guidance application may calculate a weighted sum $t_{2,BC}$ including $t_{2-B,2}$ weighted by a weight $W_{2-B,2}$ and $t_{2-C,2}$ weighted by a weight $W_{2-C,2}$. In some embodiments, $t_{2,BC}=(t_{2-B,2} \times W_{2-B,2})+(t_{2-C,2} \times W_{2-C,2})$. For example, if $t_{2-B,2}$ is 23 hours and $t_{2-C,2}$ is 25 hours, the media guidance application may assign weights of 0.5 to each length of time, and calculate $t_{B,23}$ as (23 hours× 0.5)+(25 hours×0.5)=24 hours. In some embodiments, the media guidance application assigns equal weights to components of the weighted sum $t_{2,BC}$ by default.

In some embodiments, when calculating $t_{P,1}$ based user B and user C, the media guidance application may account for the time zones in which user B and user C are located by referencing $t_{2-B,2}$ and $t_{2-C,2}$ to one of the users' time zones. In some embodiments, if user B is located in a time zone that is an amount of time $t_{offset}$ ahead of the time zone in which user C is located, the media guidance application may calculate $t_{2,BC}$ as $t_{2,BC}=(t_{2-B,2} \times W_{2-B,2})+((t_{2C,2}+t_{offset}) \times W_{2C,2})$. This may be beneficial in handling situations in which media asset 2 is transmitted in the time zone of user B before media asset 2 is transmitted in the time zone of user C. The above procedure can be extended when calculating $t_{P,1}$ based on multiple users (e.g., more than user B and user C).

In some embodiments, the media guidance application may calculate the predicted time, $t_{P,1}$, when user A will be exposed to a spoiler of the media asset 1 by adding the weighted sum $t_{2,BC}$ to $t_1$ (the initial transmission time of media asset 1). For example, if $t_1$ is Wednesday, Feb. 11, 2015, at 8:00 pm Eastern, and $t_{2,BC}$ is 24 hours, the media guidance application may calculate $t_{P,1}$ as Thursday, Feb. 12, 2015, at 8:00 pm Eastern Standard Time.

Calculating the predicted time when user A will be exposed to a spoiler of media asset 1 using data from more than one user whose electronic communications user A has viewed can be helpful in providing a more accurate predicted time. For example, user A may not view user B's electronic communications often, or user B may not typically transmit electronically electronic communications containing spoilers. Calculating the predicted time just based on data from user B could give an inaccurately early/late predicted time. Incorporating data into the weighted sum from user C, whose electronic communications user A may view at a frequency more similar to user A's typical viewing habits, or whose electronic communications may contain spoilers at a rate more typical of other users, can help to provide a more accurate prediction.

In some embodiments, the media guidance application may calculate a weighted sum by analyzing multiple other users (e.g., more than two) using the processes described herein. In some embodiments, the media guidance application may retrieve multiple electronic communications transmitted by multiple users where each of the electronic communications is the earliest electronic communication transmitted by one of the multiple users about media asset 2, calculate multiple lengths of time ($t_{2-B,2}$, $t_{2-C,2}$, etc.) for each of the multiple electronic communications, calculate a weighted sum of the multiple lengths of time, and add the weighted sum to $t_1$ to calculate $t_{P,1}$. In some embodiments, the multiple users may be friends of the user A, contacts of user A, or members of the general population. The multiple electronic communications may be publicly available electronic communications from the general population, such as publicly available posts to a social networking site.

In some embodiments, the media guidance application may calculate a weighted sum by analyzing multiple other users (e.g., more than two) and multiple media assets (e.g., more than two) using the processes described herein. In some embodiments, the media guidance application may retrieve multiple electronic communications transmitted by multiple users where each of the electronic communications is the earliest electronic communication transmitted by one of the multiple users about one of the multiple media assets, calculate multiple lengths of time ($t_{2-B,2}$, $t_{2-C,2}$, $t_{3-B,3}$, etc.) for each of the multiple electronic communications, calculate a weighted sum of the multiple lengths of time, and add the weighted sum to $t_1$ to calculate $t_{P,1}$. In some embodiments, the multiple users may be friends of the user A, contacts of user A, or members of the general population. The multiple electronic communications may be publicly available electronic communications from the general population, such as publicly available posts to a social networking site. In some embodiments, the multiple media assets may be other episodes in the same television series as media asset 1. For example, if media asset 1 is season 3 episode 3 of The Americans, the multiple media assets may be other episodes from season 3 and/or other seasons of The Americans.

In some embodiments, the media guidance application may adjust the weights $W_{2-B,2}$ and $W_{2-C,2}$ based on how frequently user A views electronic communications of user B and user C. In some embodiments, the media guidance application may determine a number of user B's electronic communications $E_{B,A}$ that user A viewed in a period of time $t_{B,A}$. In some embodiments, the media guidance application may calculate a frequency $f_{B,A}$ by dividing $E_{B,A}$ by $t_{B,A}$. For example, if user A viewed 1 of user B's electronic communications in 1 hour, the media guidance application may calculate $f_{B,A}$ to be 1 electronic communication/hr. In some embodiments, the media guidance application may determine a number of user C's electronic communications $E_{C,A}$ that user A viewed in a period of time $t_{C,A}$. In some embodiments, the media guidance application may calculate a frequency $f_{C,A}$ by dividing $E_{C,A}$ by $t_{C,A}$. For example, if user A viewed 3 of user C's electronic communications in 1 hour, the media guidance application may calculate $f_{C,A}$ to be 3 electronic communications/hr. In some embodiments, the media guidance application may determine that $f_{C,A}$ is greater than $f_{B,A}$. This may indicate that user A views user C's electronic communications more frequently that user A views user B's electronic communications. In some embodiments, based on determining that $f_{C,A}$ is greater than $f_{B,A}$, the media guidance application may adjust $W_{2-C,2}$ to be greater than $W_{2-B,2}$. For example, the media guidance application may increase $W_{2-C,2}$ and/or decrease $W_{2-B,2}$ such that the ratio between $W_{2-C,2}$ and $W_{2-B,2}$ is the same as the ratio between $f_{C,A}$ and $f_{B,A}$. For example, if $f_{C,A}$ is 3 and $f_{B,A}$ is 1, the ratio between $f_{C,A}$ and $f_{B,A}$ is 3. Accordingly, the media guidance application may adjust $W_{2-C,2}$ to be 0.75 and adjust $W_{2-B,2}$ to be 0.25 (e.g., from their default values of 0.5 and 0.5) such that the ratio between $W_{2-C,2}$ and $W_{2-B,2}$ is 3. In some embodiments, the media guidance application may only adjust the weights $W_{2-C,2}$ and $W_{2-B,2}$ if $f_{C,A}$ is a threshold amount greater than $f_{B,A}$. In some embodiments, based on determining that $f_{C,A}$ is greater than $f_{B,A}$, the media guidance application may increase and/or decrease $W_{2-C,2}$ and $W_{2-B,2}$ by fixed amounts and/or proportions.

Calculating the frequency with which user A views electronic communications from user B and user C can be helpful in determining how likely user A is to view a spoiler in electronic communications from user B and user C. For example, if user A views user C's electronic communications more often than user B's electronic communications, user A may be more likely to first see a spoiler for media asset 1 in user C's electronic communications. Therefore, it may be helpful to weight user C's contribution to the weighted sum $t_{2,BC}$ higher when calculating the predicted time.

In some embodiments, the media guidance application may calculate the predicted time, $t_{P,1}$, when user A will be exposed to a spoiler of media asset 1, using data from another electronic communication transmitted by user B about media asset 2. In some embodiments, the media guidance application may select a second electronic communication from $E_{B,2}$ (the subset of electronic communications transmitted by user B that reference media asset 2) having the latest availability time among other electronic communications in $E_{B,2}$. In some embodiments, the media guidance application may select as the second electronic communication from $E_{B,2}$ the electronic communication having the second earliest availability time among other electronic communications in $E_{B,2}$. In some embodiments, the media guidance application may select as the second electronic communication from $E_{B,2}$ a random from $E_{B,2}$. In some embodiments, the media guidance application may determine, based on the information regarding the times when each electronic communication in $E_B$ (the electronic communications transmitted by user B) was made available for user A's viewing, the availability time $t_{B,2\_2nd}$ of the second electronic communication in $E_{B,2}$.

In some embodiments, the media guidance application may calculate a length of time $t_{2-B,2\_2nd}$ from $t_2$ (the initial transmission time of media asset 2) to $t_{B,2\_2nd}$. $t_{2-B,2nd}$ represents the time from the initial transmission of media asset 2 to the availability time of the second electronic communication about media asset 2. In some embodiments, the media guidance application may perform subtraction operations to calculate $t_{B,2\_2nd}$. For example, if $t_2$ is Wednesday, Feb. 4, 2015, at 8:00 pm Eastern Standard Time and $t_{B,2\_2nd}$ is Sunday, Feb. 8, 2015, at 8:00 pm Eastern Standard Time, the media guidance application may calculate $t_{2-B,2\_2nd}$ as $t_{2-B,2\_2nd} = t_{B,2\_2nd} - t_2 = 4$ days. In some embodiments, the media guidance application may round $t_{2-B,2\_2nd}$ to the nearest second, minute, hour, day, week, month, etc. In some embodiments, the media guidance application may round $t_{2-B,2\_2nd}$ to the preceding second, minute, hour, day, week, month, etc.

In some embodiments, the media guidance application may calculate a weighted sum $t_{B,2\_2\_2nd}$ including $t_{2-B,2}$ weighted by a weight $W_{2-B,2}$ and $t_{2-B,2\_2nd}$ weighted by a weight $W_{2-B,2\_2nd}$. In some embodiments, $t_{B,2\_2\_2nd} = (t_{2-B,2} \times W_{2-B,2}) + (t_{2-B,2\_2nd} \times W_{2-B,2\_2nd})$. For example, if $t_{2-B,2}$ is 23 hours and $t_{2-B,2\_2nd}$ is 4 days, the media guidance application may assign weights of 0.5 to each length of time, and calculate $t_{B,23}$ as $(23 \text{ hours} \times 0.5) + (4 \text{ days} \times 0.5) = 59.5$ hours. In some embodiments, the media guidance application may assign equal weights to components of the weighted sum $t_{B,2\_2\_2nd}$ by default.

In some embodiments, the media guidance application may calculate the predicted time, $t_{P,1}$, when user A will be exposed to a spoiler of the media asset 1 by adding the weighted sum $t_{B,2\_2\_2nd}$ to $t_1$ (the initial transmission time of media asset 1). If $t_1$ is Wednesday, Feb. 11, 2015, at 8:00 pm Eastern, and $t_{B,2\_2\_2nd}$ is 59.5 hours, the media guidance application may calculate $t_{P,1}$ as Saturday, Feb. 14, 2015, at 7:30 am Eastern Standard Time. In some embodiments, the media guidance application may calculate a weighted sum by analyzing more than two electronic communications in $E_{B,2}$.

Calculating the predicted time when user A will be exposed to a spoiler of media asset 1 using data about two of user B's earliest electronic communications about two different media assets can be helpful in providing a more accurate predicted time. For example, user B may not typically include spoilers in user B's first electronic communications about a media asset, but may instead typically include spoilers in the latest electronic communication, or the second earliest electronic communication, for example. Calculating the predicted time just based on data from user B's earliest electronic communication about media asset 2 could give an inaccurately early predicted time. Incorporating data about other electronic communications from user B about media asset 2 (e.g., the second earliest electronic communication, the latest electronic communication, etc.) into the weighted sum can help to provide a more accurate prediction.

In some embodiments, the media guidance application may adjust the weights $W_{2-B,2}$ and $W_{2-B,2\_2nd}$ based on a number of words that correspond to spoilers in the electronic communication having the earliest availability time in $E_{B,2}$ and the second electronic communication in $E_{B,2}$. Words that correspond to spoilers may include words such as "spoil" and "spoilers" and exclamation words such as "Oh," "believe," "surprise," "cliffhanger," "dead," etc. In some embodiments, the media guidance application may compare words from the electronic communication having the earliest availability time to the keywords that correspond to spoilers. In some embodiments, the media guidance application may determine a number of words $w_1$ in the electronic communication having the earliest availability time that match the keywords corresponding to spoilers. For example, if the keywords corresponding to spoilers are "spoil," "Oh," "believe," "surprise," "cliffhanger," and "dead," and the text of the electronic communication having the earliest availability time is "Watching The Americans with my wife," the media guidance application may calculate $w_1$ as zero, because no words in the text match any of the keywords. In some embodiments, the media guidance application may compare words from the second electronic communication to keywords that correspond to spoilers. In some embodiments, the media guidance application may determine a number of words $w_2$ in the second electronic communication that match the keywords corresponding to spoilers. For example, if the text of the second electronic communication is "Oh my gosh I can't believe that Elizabeth beat up Gaad," the media guidance application calculate $w_2$ to be 2 because "Oh" and "believe" in the second electronic communication match the keywords corresponding to spoilers. The media guidance application may use the process depicted in FIGS. 9 and 10 to perform these keywords comparisons. In some embodiments, the media guidance application may determine that $w_2$ is greater than $w_1$. In some embodiments, based on determining that $w_2$ is greater than $w_1$, the media guidance application may adjust $W_{2-B,2\_2nd}$ to be greater than $W_{2-B,2}$. For example, the media guidance application may increase $W_{2-B,2\_2nd}$ and/or decrease $W_{2-B,2}$ such that the ratio between $W_{2-B,2\_2nd}$ and $W_{2-B,2}$ is the same as the ratio between $w_2$ and $w_1$. For example, if $w_2$ is 3 and $w_1$ is 1, the ratio between $w_2$ and $w_1$ is 3. Accordingly, the media guidance application may adjust $W_{2-B,2\_2nd}$ to be 0.75 and adjust $W_{2-B,2}$ to be 0.25 (e.g., from their default values of 0.5 and 0.5) such that the ratio between $W_{2-B,2\_2nd}$ and $W_{2-B,2}$ is 3. In some embodiments, the media guidance application may only adjust the weights $W_{3-B,3}$ and $W_{2-B,2}$ if $w_2$ is a threshold amount greater than $w_1$. In some embodiments, based on determining that $w_2$ is greater than $w_1$, the media guidance application may increase and/or decrease $W_{2-B,2\_2nd}$ and $W_{2-B,2}$ by fixed amounts and/or proportions.

Calculating a number of keywords corresponding to spoilers in two different electronic communications from user B about media asset 2 can be helpful in determining which electronic communication is more likely to contain spoilers. For example, if user B's earliest electronic communication contains fewer keywords corresponding to spoilers than user B's second earliest electronic communication, that may indicate that the second electronic communication is more likely to include spoilers than the earliest electronic communication. Accordingly, assigning a higher weight to data from the second electronic communication can provide a more accurate prediction.

In some embodiments, instead of/in addition to adjusting $W_{2-B,2\_2nd}$ and $W_{2-B,2}$ based on comparing their corresponding electronic communications to keywords corresponding to spoilers, the media guidance application may adjust $W_{2-B,2\_2nd}$ and $W_{2-B,2}$ based on confidence that the corresponding electronic communications correspond to media asset 2. In some embodiments, the media guidance application may compare the text of the electronic communications to keywords corresponding to media asset 2, where each keyword is associated with a confidence level that the keyword corresponds to media asset 2. For example, if media asset 2 is an episode of the television series Parks and Recreation, two of the keywords corresponding to media asset 2 may be "Leslie" and "Knope," because Leslie Knope is a character in Parks and Recreation. The keyword "Leslie" may be associated with a lower confidence level than "Knope" because "Leslie" is a more common name than "Knope" and "Leslie" may be associated with more media assets besides media asset 2 than "Knope" is. In some embodiments, an official hashtag associated with media asset 2 may be associated with a high confidence level because an official hashtag may more unambiguously refer to media asset 2. In some embodiments, the media guidance application may assign a confidence level to an electronic communication that is equal to the confidence level of the keyword in the electronic communication that has the highest confidence level. In some embodiments, the media guidance application may adjust $W_{2-B,2\_2nd}$ and $W_{2-B,2}$ such that the ratio between $W_{2-B,2\_2nd}$ and $W_{2-B,2}$ is the same as the ratio between the confidence levels of the corresponding electronic communications. For example, if the electronic communication having the earliest availability time in $E_{B,2}$ contains the keyword "Leslie," "Leslie" has a confidence level of 0.25, the second electronic communication in $E_{B,2}$ contains the official hashtag of media asset 2, and the official hashtag of media asset 2 has a confidence level of 1, the media guidance application may adjust $W_{2-B,2\_2nd}$ to be 0.8 and $W_{2-B,2}$ to be 0.2.

In some embodiments, the media guidance application may generate a notification for user A, where the notification indicates that user A is predicted to be exposed to a spoiler of the media asset 1 at $t_{P,1}$. In some embodiments, the media guidance application may generate for display the notification on a display screen, such as program listings display 200 or video mosaic display 300 (as discussed below in FIGS. 2-5), that is shown on display 414. In some embodiments, in or near a listing associated with media asset 1 (e.g., program listings 208, 214, 216, 218, 306, 308, 310, and 312), the media guidance application may generate for display $t_{P,1}$. In some embodiments, in or near the listing associated with media asset 1, the media guidance application may generate for display a metric corresponding to the length of time from the current time to $t_{P,1}$. Values of the metric may be letters (e.g., A, B, C, etc.), numbers (e.g., 1, 100, etc.), words (e.g., low, medium, high, etc.), or any other units. The media guidance application may compare to a threshold the length of time from the current time to $t_{P,1}$ in order to determine which value to generate for display. For example, if the amount of time from the current time to $t_{P,1}$ is above a threshold, the media guidance application may generate for display "low" in or near the listing for media asset 1. For example, if the amount of time from the current time to $t_{P,1}$ is below a threshold, the media guidance application may generate for display "high" in or near the listing for media asset 1, indicating that there is a large risk of spoilage. In some embodiments, the media guidance application may calculate a length of time from the current time to the $t_{P,1}$, compare the length of time to a threshold, and generate for display a listing for media asset 1 in a section of the display dedicated to media assets with approaching predicted times of spoilage. For example, the section of the display may display listings for media assets having predicted times that are within one day, two days, one week, one hour, etc. In some embodiments, the media guidance application may generate using speakers 414 a sound or a voice alert indicating that the media asset 1 has an approaching predicted time of spoilage, and/or send user A a text message and/or email indicating that media asset 1 has an approaching predicted time of spoilage.

By generating the notification for user A, where the notification indicates that user A is predicted to be exposed to a spoiler of media asset 1 at the predicted time, the media guidance application may encourage user A to view media asset 1 before the predicted time when user A will be exposed to a spoiler of media asset 1. This may reduce the risk that user A will be exposed to a spoiler of media asset 1.

As discussed above, in some cases, $t_{P,1}$ (the predicted time when user A may be exposed to a spoiler of media asset 1) as calculated by the media guidance application may precede the transmission time of media asset in user A's time zone. In such cases, in some embodiments, the media guidance application may generate a notification for the user that the predicted time when user A may be exposed to a spoiler of media asset 1 precedes the transmission time of media asset in user A's time zone. For example, the notification may read, "High Risk of Spoilage!", "Immediate Risk of Spoilage!," "Predicted Time of Spoilage Precedes Transmission Time!", etc. This notification may be in addition to or instead of generating a notification containing the predicted time.

In some embodiments, the media guidance application may retrieve media asset identifiers associated with media assets that were initially transmitted in the past. The media assets may include media asset 1. For example, the media assets may be media assets saved by a user for viewing later, or media assets saved automatically by the media guidance application based on user preferences. In some embodiments, the media guidance application may calculate predicted times when user A will be exposed to spoilers for each of the media assets, using any of the processes discussed above. In some embodiments, the media guidance application may generate a ranking of the media assets based on the predicted times. For example, the media guidance application may rank the media assets by predicted time of spoilage, from earliest predicted time to latest predicted time. In some embodiments, the media guidance application may generate for display, on a display screen (e.g., display 412), the identifiers of the media assets ranked according to the ranking of the media assets. For example, if the identifiers of the media assets are titles of the media assets, the media guidance application may generate for display the titles of the media assets in a list, with titles of media assets having earlier predicted times of spoilage displayed higher in the list than titles of media assets having later predicted times of spoilage.

In some embodiments, the media guidance application may generate the notification for user A, where the notification indicates that user A is predicted to be exposed to a spoiler of media asset 1 at the predicted time, based on an amount of time until the predicted time. In some embodiments, the media guidance application may retrieve the current time. For example, the media guidance application may retrieve the current time from a clock (e.g., a clock in processing circuitry 406), from a remote server, or from an internet-based clock. In some embodiments, the media guidance application may determine a length of time from the current time to the predicted time of spoilage. In some embodiments, the media guidance application may perform subtraction operations to calculate the length of time. For example, if the predicted time of spoilage is Thursday, Feb. 12, 2015, at 7:00 pm, and the current time is Thursday, Feb. 12, 2015, at 7:00 am, the media guidance application may calculate the length of time from the current time to the predicted time of spoilage to be 12 hours. In some embodiments, the media guidance application may compare the length of time to a threshold length of time and determining whether the length of time is smaller than the threshold length of time. For example, if the threshold length of time is 14 hours, and the length of time from the current time to the predicted time of spoilage is 12 hours, the media guidance application may determine that the length of time is smaller than the threshold time. In some embodiments, the media guidance application may generate the notification indicating the predicted time of spoilage based on determining that the length of time is smaller than the threshold length of time. In some embodiments, the media guidance application may not generate a notification of the predicted time of spoilage until the length of time from the current time to the predicted time of spoilage is smaller than the threshold length of time. In some embodiments, the threshold length of time may be predetermined, or may be set by user preferences. Generating the notification once the predicted time of spoilage is within a threshold length of time can help to avoid presenting too much information about predicted times of spoilage for media assets whose predicted times of spoilage may be far off in the future. Generating the notification once the predicted time of spoilage is within a threshold length of time can help to alert user A that the predicted time of spoilage is approaching soon for media asset 1 and encourage user A to watch media asset 1 soon to avoid being spoiled.

In some embodiments, the media guidance application may incorporate data from electronic communications about media asset 1 into the calculation of the predicted time of spoilage. In some embodiments, the media guidance application may count a number of electronic communications from a user whose electronic communications user A has viewed (e.g., user B or user C), multiple users whose electronic communication user A has viewed, or from the general population, and incorporate this number into the calculation of the predicted time of spoilage. For example, if the number of electronic communications is greater than certain thresholds, the media guidance application may make the calculated predicted time of spoilage earlier by fixed amounts (e.g., 1 day, 12 hours, etc.) corresponding to the thresholds. For example, if the predicted time of spoilage for media asset 1 (calculated using any of the processes described herein) is Thursday, Feb. 12, 2015, at 7:00 pm, once 100 electronic communications have been transmitted about media asset 1 (e.g., by the general population, by friends of user A, by contacts of user A, etc.), the media guidance application may make the predicted time of spoilage earlier by 12 hours, to Thursday, Feb. 12, 2015, at 7:00 am. Once another 100 electronic communications have been transmitted about media asset 1, the media guidance application may make the predicted time of spoilage earlier by another 12 hours, to Wednesday, Feb. 11, 2015, at 7:00 pm. Therefore, the media guidance application may adjust the predicted time of spoilage of media asset 1 in real-time as electronic communications are transmitted about media asset 1.

In some embodiments, the media guidance application may incorporate historical data about internet activity following transmission of media assets into the calculation of the predicted time of spoilage. In some embodiments, the media guidance application may retrieve (e.g., from a remote server) historical data regarding the average number $N_{avg}$ of electronic communications transmitted by the general population about a media asset after the media asset has been transmitted, where $N_{avg}$ represents an average across a plurality of media assets transmitted in the past. In some embodiments, the media guidance application may count a number $N_1$ of electronic communications transmitted about media asset 1 after the transmission time of media asset 1 and compare it to $N_{avg}$. In some embodiments, the media guidance application may adjust the predicted time of spoilage based on how much greater or less $N_1$ is than $Na_{vg}$. For example, if $N_1$ is greater than $N_{avg}$ by 1000, the media guidance application may make the predicted time of spoilage earlier by 6 hours. For example, if $N_1$ is greater than $Na_{vg}$ by 2000, the media guidance application may make the predicted time of spoilage earlier by 12 hours. For example, if $N_1$ is less than $N_{avg}$ by 1000, the media guidance application may make the predicted time of spoilage later by 6 hours.

In some embodiments, the media guidance application may search (e.g., the internet, a remote server, etc.) for articles about media asset 1 that contain spoilers. For example, the media guidance application may search for articles about media asset 1 that contain keywords corresponding to spoilers such as "believe," "surprise," "cliffhanger," "dead," etc. In some embodiments, if the media guidance application finds an article about media asset 1 that contains keywords corresponding to spoilers, the media guidance application may generate a notification about media asset 1 for the user that reads "High Risk of Spoilage!", "Immediate Risk of Spoilage!," etc. In some embodiments, the media guidance application may block user A from viewing the article.

In some embodiments, the media guidance application may incorporate other data in the calculation of the predicted time of spoilage. In some embodiments, the media guidance application may retrieve (e.g., from a remote server) viewership data including information about how long it typically takes users to view media assets like media asset 1 (e.g., shows in the same television series) after initial transmission of the media assets. In some embodiments, the media guidance application may add this length of time to any of the sums or weighted sums discussed above for calculating the predicted time of spoilage. In some embodiments, the media guidance application may retrieve (e.g., from a remote server) viewership data including information about how many people have already watched media asset 1. If a threshold number of people have already watched media asset 1, media asset 1 may be more likely to be spoiled, and the media guidance application may incorporate this information into calculations of the predicted time of spoilage. For example, if the threshold number of people of already viewed media asset 1, the media guidance application may make the calculated predicted time of spoilage earlier by a fixed amount (e.g., 1 day, 12 hours, etc.). In some embodiments, the media guidance application may make the calculated predicted time of spoilage earlier by an amount proportional to the number of people who have already watched media asset 1. In some embodiments, the media guidance application may retrieve (e.g., from media content source 516, media guidance data source 518, and/or another remote server) information about whether media asset 1 is a season premiere or season finale. In some embodiments, if media asset 1 is a season premiere or a season finale, and therefore may be more likely to spoiled (because season premieres and season finales often have more surprising plot development than non-premieres or finales), the media guidance application may incorporate this information into calculations of the predicted time of spoilage. In some embodiments, the media guidance application may make the calculated predicted time of spoilage earlier for a media asset that is a season premiere or finale earlier by a fixed amount (e.g., 1 day, 12 hours, etc.).

As discussed above, in some embodiments the media guidance application may use data from multiple users' electronic communications about media asset 2 to calculate the predicted time of spoilage. In some embodiments, the media guidance application may weight the data from multiple users' electronic communications about media asset 2 based on (e.g., proportionally to) the proportion of the total viewers of media asset 2 who transmit electronic communications about media asset 2. For example, if 1000 viewers viewed media asset 2, and 100 of them transmitted electronic communications about media asset 2, the media guidance application may weight those electronic communications higher than if 10,000 viewers viewed media asset 2, and 100 of them transmitted electronic communications about media asset 2. This may be helpful because a high proportion of users transmitting electronic communications about a media asset may indicate a high level of excitement and interest in media asset 2, and a high risk of spoilage.

In some embodiments, the media guidance application may calculate a metric of intensity of viewer response to a media asset. For example, the media guidance application may retrieve (e.g., from a remote server) information about what proportion of the total viewers of media asset 2 have watched media asset 2 multiple times. This proportion may serve as the metric of intensity of viewer response to media asset 2. In some embodiments, the media guidance application may incorporate this metric into calculations of the predicted time of spoilage of media asset 2. For example, if the metric is greater than a threshold, the media guidance application may weight higher the contribution of electronic communications about media asset 2 to any of the weighted sums discussed above. In some embodiments, the media guidance application may make the calculated predicted time of spoilage earlier or by an amount proportional to the metric.

In some embodiments, the media guidance application may block electronic communications from being viewed by user A to avoid user A encountering spoilers of media asset 1. In some embodiments, the media guidance application may block electronic communications from users (such as user B and user C) whose electronic communications user A has viewed. In some embodiments, the media guidance application may block electronic communications from users who have transmitted electronic communications about media assets in the past. In some embodiments, the media guidance application may block electronic communications from users who have transmitted electronic communications about media assets that are similar to media assets in the past. In some embodiments, the media guidance application may block electronic communications from all of user A's friends, contacts, etc. In some embodiments, the media guidance application may block all electronic communications. In some embodiments, the media guidance application may compare words from an electronic communication to keywords corresponding to media asset 1 and block the electronic communication if a match between the words and the keywords is found. In some embodiments, the media guidance application may use the processes depicted in FIGS. 9 and 10 to perform keyword comparisons. In some embodiments, the media guidance application may receive an input from user A to block electronic communications. In some embodiments, the media guidance application may only block electronic communications once the predicted time of spoilage is within a threshold length of time. The threshold length of time may be the same as or different from the threshold length of time used to determine whether to generate a notification for user A, as discussed above. In some embodiments, the media guidance application blocks electronic communications by refraining from displaying them on a display screen of a user equipment device used by user A. In some embodiments, the media guidance application blocks electronic communications by blocking a user from using an application on a user equipment device that enables viewing electronic communications. By blocking electronic communications, it may be possible to delay the predicted time of spoilage of media asset 1 for user A.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
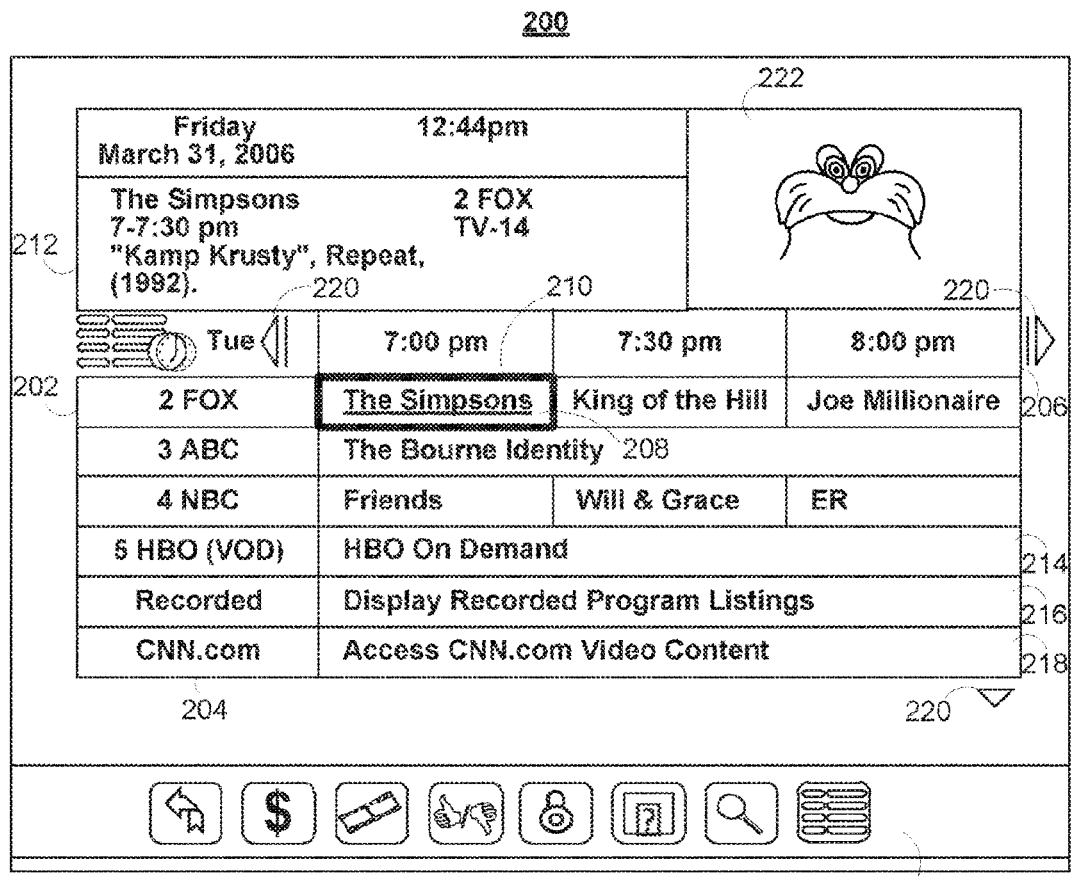
FIG. 2 shows an illustrative embodiment of a display screen that may be used to provide media guidance application listings and other media guidance information, in accordance with some embodiments of the disclosure.
Figure 3:
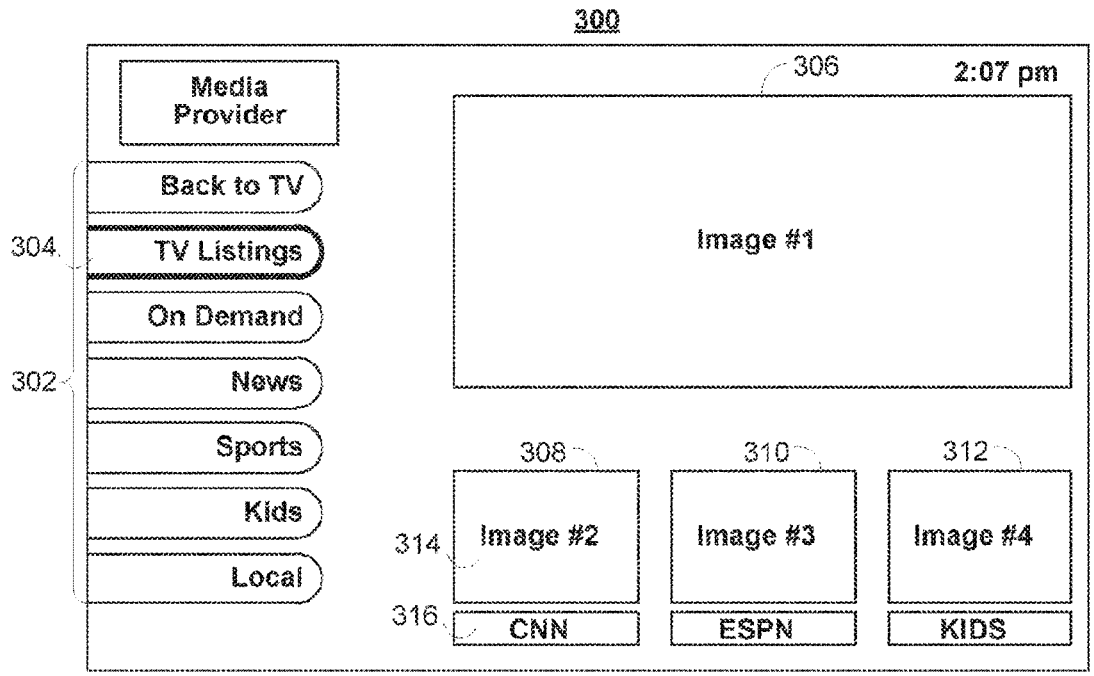
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
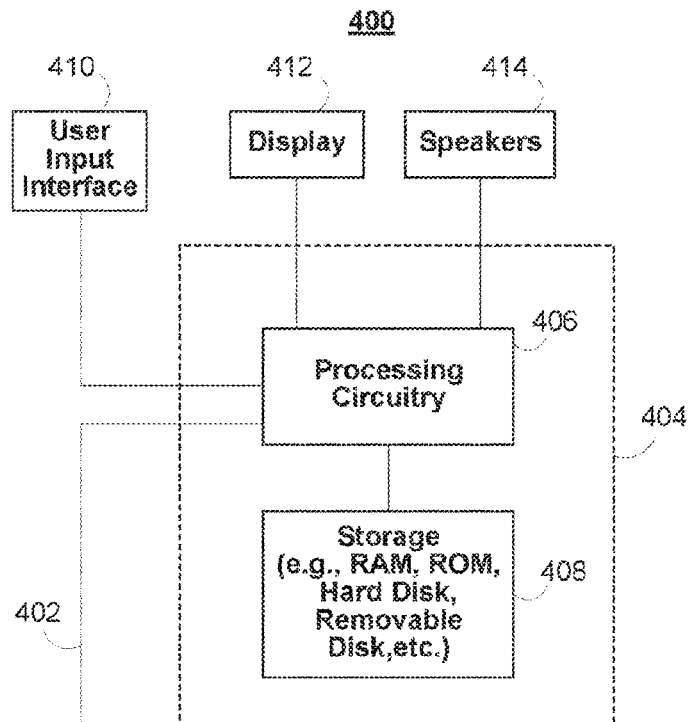
FIG. 4 shows a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
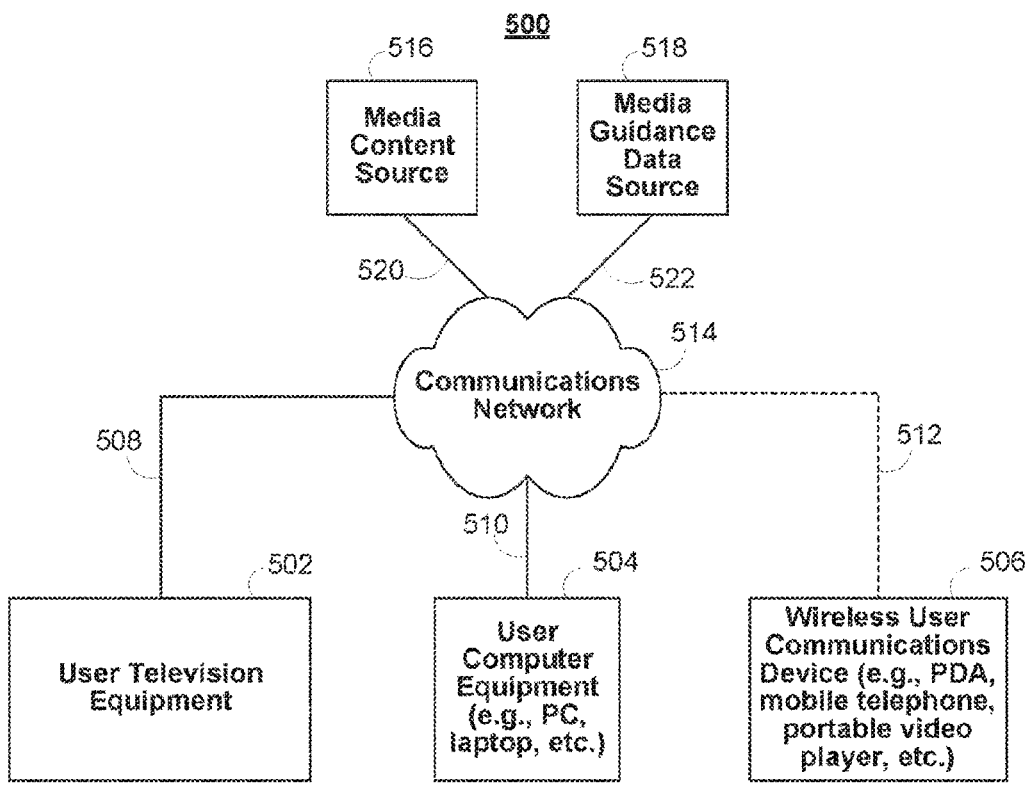
FIG. 5 shows a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
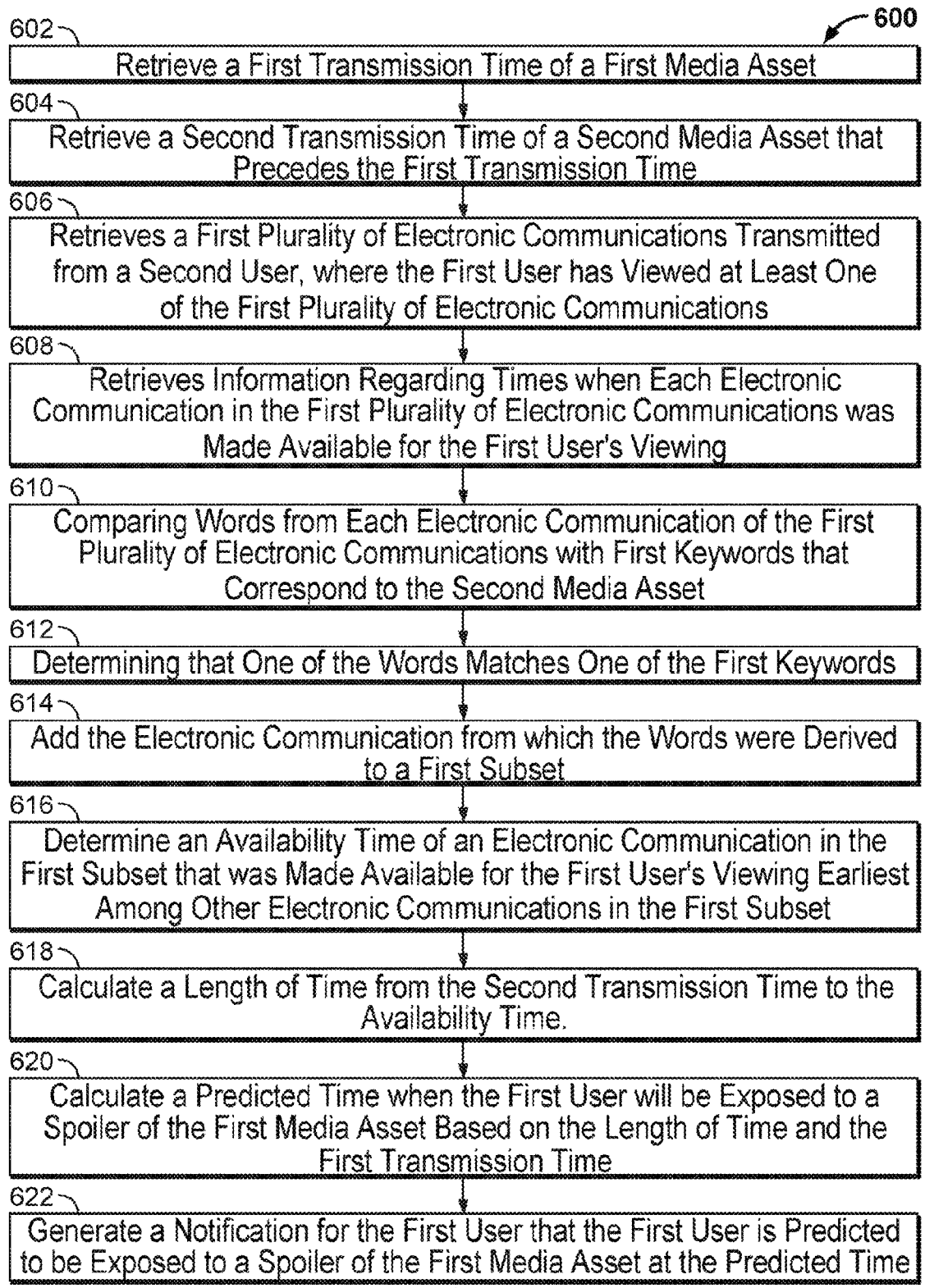
FIG. 6 shows an illustrative flowchart of a process for calculating a predicted time when a first user will be exposed to a spoiler of a first media asset, in accordance with some embodiments of the disclosure.

FIG. 6 depicts an illustrative flowchart of a process 600 for calculating a predicted time when a first user will be exposed to a spoiler of a first media asset. A media guidance application causes control circuitry 404 of user equipment (e.g., user equipment 100, user equipment 400, user television equipment 502, user computer equipment 504, or wireless user communications device 506) to execute each of the elements of FIG. 6. Process 600 begins at 602, where control circuitry 404 retrieves a first transmission time (corresponding to time 106 in FIG. 1) of a first media asset (corresponding to media asset 104 in FIG. 1) that has been initially released by way of simultaneous transmission to a plurality of viewers at the first transmission time, where the first media asset was not previously simultaneously transmitted to the plurality of viewers prior to the first transmission time. For example, the first media asset may be an episode of a television series and the first transmission time may be the release date of the episode (e.g., Wednesday, Feb. 11, 2015, at 8:00 pm Eastern Standard Time). Control circuitry 404 may retrieve the first transmission time by transmitting a request to media content source 516, media guidance data source 518, or a remote server through communication network 514, for metadata associated with the first media asset, receive the metadata, and extract the first transmission time from the metadata.

Process 600 continues to 604, where control circuitry 404 retrieves a second transmission time (corresponding to time 110 in FIG. 1) of a second media asset (corresponding to media asset 108 in FIG. 1) that has been initially released by way of simultaneous transmission to the plurality of viewers at the second transmission time, where the second media asset was not previously simultaneously transmitted to the plurality of viewers prior to the second transmission time, and where the second transmission time precedes the first transmission time. For example, the second media asset may be an episode of a different television series from the television series of the first media asset, and the second transmission time may be the air date of the second media asset. For example, if the first transmission time is Wednesday, Feb. 11, 2015, at 8:00 pm Eastern Standard Time, the second transmission time may be Wednesday, Feb. 4, 2015, at 8:00 pm Eastern Standard Time, which precedes the first transmission time. Control circuitry 404 may retrieve the second transmission time by transmitting a request to media content source 516, media guidance data source 518, or a remote server through communication network 514, for metadata associated with the second media asset, receive the metadata, and extract the second transmission time from the metadata.

Process 600 continues to 606, where control circuitry 404 retrieves a first plurality of electronic communications transmitted from a second user, where user A has previously viewed at least one of the first plurality of electronic communications. For example, the second user may be an individual, or a group of individuals, or an organization. For example, the electronic communications may be text messages, emails, posts on social media networks, or articles on the internet. Control circuitry 404 may retrieve the first plurality of electronic communications transmitted from a user equipment device 400, such as user television equipment 502, user computer equipment 504, or wireless user communications device 506, that the first user uses to view electronic communications transmitted by the second user. Control circuitry 404 may retrieve the first plurality of electronic communications from a remote server through communication network 514.

Process 600 continues to 608, where control circuitry 404 retrieves information regarding a respective time when each electronic communication in the first plurality of electronic communications was made available for the first user's viewing. For example, the availability time of a text message or email may be the time when the text message or email is sent by the second user. For example, the availability time of a social media post may be the time when the post is posted by the second user. For example, the availability time of an internet article may be the time when it is published on the internet. Control circuitry 404 may retrieve this information from a user equipment device 400, such as user television equipment 502, user computer equipment 504, or wireless user communications device 506, that the first user uses to view electronic communications transmitted by the second user. The availability time information may exist explicitly in a database on user equipment device 400, or control circuitry 404 may retrieve the first plurality of electronic communications from user equipment device 400 and then process the electronic communications themselves, or metadata associated with the electronic communications, to extract the availability time information. Control circuitry may retrieve the availability time information from a remote server through communication network 514.

Process 600 continues to 610, where control circuitry 404 determines a first subset of the first plurality of electronic communications, where each electronic communication in the first subset references the second media asset, by comparing respective words from each respective electronic communication of the first plurality of electronic communications with first keywords, where the first keywords correspond to the second media asset. For example, the first keywords may be actors, characters, directors, writers, plot details, locations, an official hashtag associated with the second media asset, etc., corresponding to the second media asset. Control circuitry 404 may retrieve the first keyword from entries of a database stored on storage 408 of user equipment device 400, and user equipment device 400 may be user television equipment 502, user computer equipment 504, or wireless user communications device 506. Control circuitry 404 may retrieve the entries of the database from media content source 516, media guidance data source 518, and/or a remote server through communication network 514. Control circuitry 404 may generate the database by searching for keywords that correspond to the second media asset. Control circuitry 404 may search user equipment device 400, user television equipment 502, user computer equipment 504, wireless user communications device 506, media content source 516 and/or media guidance data source 518 for the keywords.

Process 600 continues to 612, where control circuitry 404 further determines the first subset by determining that a word of the respective words matches a keyword of the first keywords. For example, if an electronic communication contains the text "Elizabeth Jennings fights Agent Gaad," and the first keywords include "Russia," "spy," and "Gaad," control circuitry 404 may determine that the word "Gaad" in the electronic communication matches the first keyword "Gaad."

Process 600 continues to 614, where control circuitry further determines the first subset by adding, based on determining that the word of the respective words matches the keyword of the first keywords, the respective electronic communication from which the respective words were derived to the first subset. For example, if an electronic communication contains the text "Elizabeth Jennings fights Agent Gaad," and a word of the text matches one of the first keywords, control circuitry 404 may add the electronic communication containing the text "Elizabeth Jennings fights Agent Gaad" to the first subset.

Process 600 continues to 616, where control circuitry 404 determines, based on the information regarding the respective time when each electronic communication in the first plurality of electronic communications was made available for the first user's viewing, a first availability time (corresponding to time 114 in FIG. 1) of a first electronic communication (corresponding to electronic communication 112 in FIG. 1) in the first subset that was made available for the first user's viewing earliest among other electronic communications in the first subset. For example, control circuitry 404 may sort the availability times of the first subset of electronic communications using any sorting algorithm, find the earliest availability time based on the sorting, and select as the first electronic communication the electronic communication having the earliest availability time.

Process 600 continues to 618, where control circuitry 404 calculates a first length of time (corresponding to length of time 116 in FIG. 1) from the second transmission time to the first availability time. For example, if the second transmission time is Wednesday, Feb. 4, 2015, at 8:00 pm Eastern Standard Time and the first availability time is Thursday, Feb. 5, 2015, at 7:00 pm Eastern Standard Time, control circuitry 404 may calculate the first length of time to be 23 hours.

Process 600 continues to 620, where control circuitry 404 calculates a predicted time (corresponding to time 102 in FIG. 1) when the first user will be exposed to a spoiler (corresponding to spoiler 118 in FIG. 1) of the first media asset based on the first length of time and the first transmission time. For example, if the first transmission time is Wednesday, Feb. 11, 2015, at 8:00 pm Eastern Standard Time and the first length of time is 23 hours, control circuitry 404 may calculate the predicted time to be Thursday, Feb. 12, 2015, at 7:00 pm Eastern Standard Time.

Process 600 continues to 622, where control circuitry 404 generates a notification for the first user, where the notification indicates that the first user is predicted to be exposed to a spoiler of the first media asset at the predicted time. Control circuitry 404 may generate the notification for display on display 412 and/or generate an audio/voice alert using speakers 414. For example, control circuitry 404 may generate for display the predicted time on a display screen near a program listing for the first media asset. For example, control circuitry 404 may generate an audio or voice alert indicating the predicted time. For example, control circuitry 404 may send the first user an email or text message indicating the predicted time.

It should be noted that process 600 or any step thereof could be performed on, or provided by, any of the devices shown in FIGS. 1 and 4-5. For example, process 600 may be executed by control circuitry 404 (FIG. 4) as instructed by control circuitry implemented on user equipment 502, 504, 506 (FIG. 5), and/or user equipment, in order to calculate a predicted time when a first user will be exposed to a spoiler of a first media asset. In addition, process 600 may be incorporated into or combined with one or more steps of any other process or embodiment.

Figure 7:
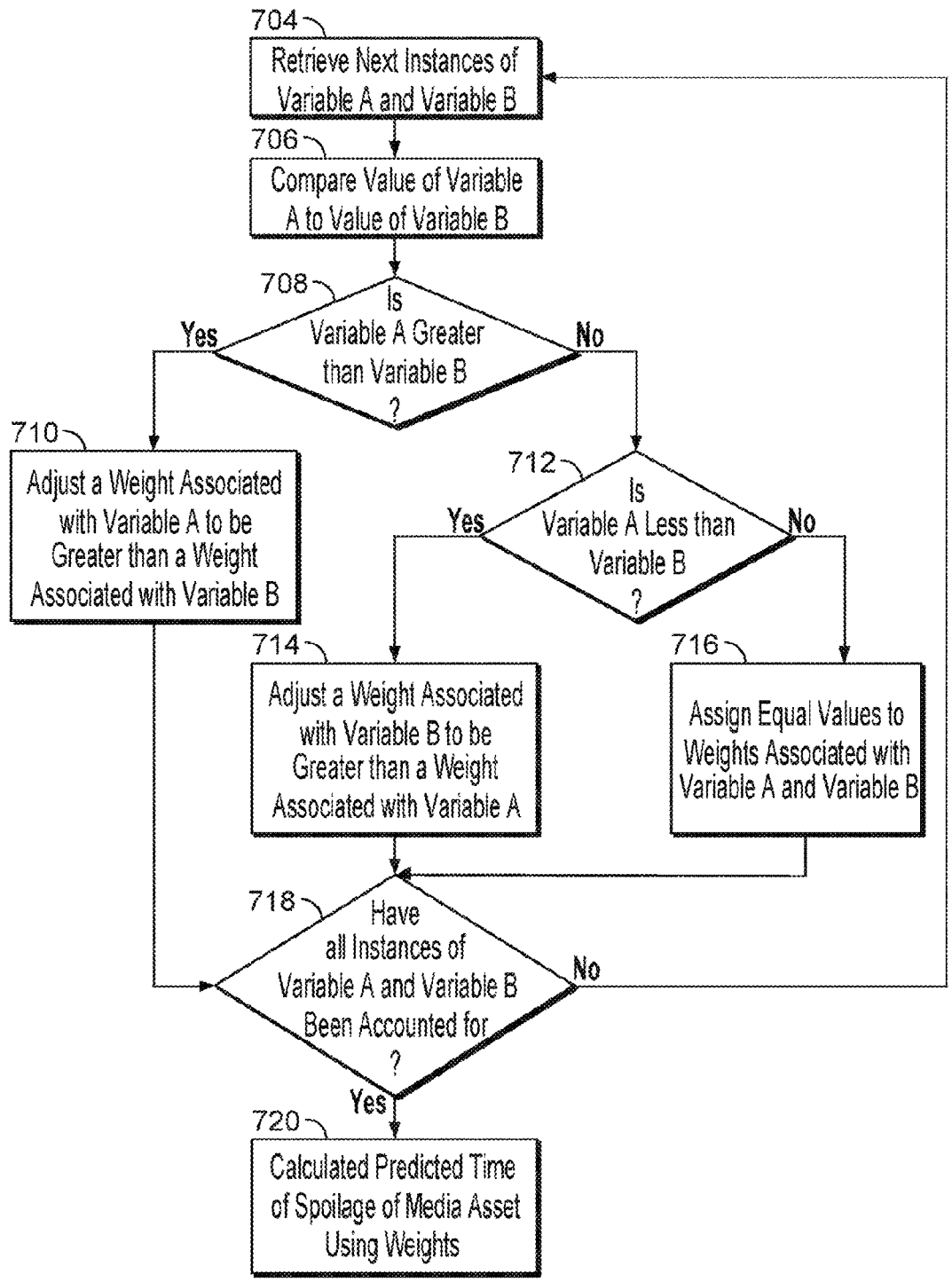
FIG. 7 shows a flowchart for a process implemented on control circuitry to compare two values in accordance with some embodiments of the disclosure.

FIGS. 7 and 8 present processes for control circuitry (e.g., control circuitry 404) to compare two values in accordance with some embodiments of the disclosure. The two values may be, for example, two frequencies, two relative numbers of overlap between two sets of keywords, or two numbers of words in electronic communications that match keywords, and based on the comparison, one weight used in calculating a predicted time of spoilage of a media asset may be adjusted to be greater than another weight used in calculating the predicted time of spoilage of the media asset, as discussed above. In some embodiments this algorithm may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

The flowchart in FIG. 7 describes a process 700 implemented on control circuitry (e.g., control circuitry 404) to compare two values in accordance with some embodiments of the disclosure. The two values will be referred to as Variable A and Variable B. As discussed above, Variable A and Variable B may be two frequencies, two relative numbers of overlap between two sets of keywords, or two numbers of words in electronic communications that match keywords, used in calculating a predicted time of spoilage of a media asset.

At step 704, control circuitry 404 proceeds to retrieve the next instances of Variable A and Variable B from stored memory. In some embodiments control circuitry 404 may receive single primitive data structures that represent the values of Variable A and Variable B. In some embodiments the values may be stored as part of a larger data structure, and control circuitry 404 may retrieve the values by executing appropriate accessor methods to retrieve the value from the larger data structure. The algorithm may proceed to step 706.

At step 706, control circuitry 404 proceeds to compare the value of Variable A to the value of Variable B. In some embodiments, control circuitry 404 may directly compare the value of Variable B with the value of Variable A by accessing the values respectively from memory and performing a value comparison. In some instances, control circuitry 404 may call a comparison function (e.g., for object to object comparison) to compare Variable A and Variable B. The algorithm may proceed to step 708.

At step 708, control circuitry 404 compares the values of Variable A and Variable B to determine if the value of Variable A is greater than the value of Variable B. If the condition is satisfied, the algorithm may proceed to step 710; if the condition is not satisfied, the algorithm may proceed to step 712 instead.

At step 710, control circuitry 404 executes a subroutine to adjust a weight associated with Variable A to be greater than a weight associated with Variable B based on the condition at step 708 being satisfied. After the subroutine is executed, the algorithm may proceed to step 718 where it is determined if all instances of Variable A are accounted for and further iterations are needed.

At step 712, control circuitry 404 compares the values of Variable A and Variable B to determine if the value of Variable A is less than the value of Variable B. If the condition is satisfied, the process may proceed to step 714; if the condition is not satisfied, the process may proceed to step 716 instead.

At step 714, control circuitry 404 executes a subroutine to adjust a weight associated with Variable B to be greater than a weight associated with Variable A based on the condition of step 712 being satisfied. After the subroutine is executed, the algorithm may proceed to step 718 where it is determined if all instances of Variable A are accounted for and if further iterations are needed.

At step 716, control circuitry 404 executes a subroutine to assign equal values to weights associated with Variable A and Variable B based on both of the conditions in 708 and 712 not being satisfied. After the subroutine is executed, the algorithm may proceed to 718 where it is determined if all instances of Variable A are accounted for and if further iterations are needed.

At step 718, control circuitry 404 checks if all instances of Variable A and Variable B are accounted for. If all of the instances have been evaluated, control circuitry 404 may proceed to step 720. For example, control circuitry 404 may call a function to see if there is a next element of Variable A or Variable B. If the function returns true (i.e., there are still instances that need to be processed), control circuitry 404 may proceed to step 704.

At step 720, control circuitry 404 executes a subroutine to calculate a predicted time of spoilage of a media asset using the weights.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations, such as those at 708 and 712, may be performed in any order or in parallel or simultaneously to reduce lag or increase the speed of the system or method. As a further example, in some embodiments several instances of Variable A and Variable B may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 2-5 could be used to implement one or more portions of the process.

The pseudocode in FIG. 8 describes a process 800 to compare two values in accordance with some embodiments of the disclosure. The two values may be, for example, two frequencies, two relative numbers of overlap between two sets of keywords, or two numbers of words in electronic communications that match keywords, and based on the comparison, one weight used in calculating a predicted time of spoilage of a media asset may be adjusted to be greater than another weight used in calculating the predicted time of spoilage of the media asset, as discussed above. It will be evident to one skilled in the art that the process 800 described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 404 runs a subroutine to initialize variables and prepare to compare two values, which begins on line 805. For example, in some embodiments control circuitry 404 may copy instructions from non-transitory storage medium (e.g., storage device 408) into RAM or into the cache for processing circuitry 406 during the initialization stage.

At line 805, control circuitry 404 receives instances of Variable A and Variable B. In some embodiments these instances may be retrieved from stored memory. Control circuitry 404 may receive instances of Variable A and Variable B by receiving, for example, pointers to arrays of values of Variable A and Variable B. In another example, control circuitry 404 may receive objects of a class, such as iterator objects containing elements of Variable A and Variable B.

At line 806, control circuitry 404 iterates through the various instances of Variable A and Variable B. If only a single instance of each variable is available, the loop will only execute once. This loop may be implemented in multiple fashions depending on the choice of hardware and software language used to implement the algorithm of FIG. 8; for example, this may be implemented as part of a "for" or "while" loop.

At line 807, control circuitry 404 stores the value of Variable A into a temporary variable "A." In some embodiments the value of Variable A will be stored as part of a larger data structure or class, and the value of Variable A may be obtained through appropriate accessor methods. In some embodiments Variable A may be converted from a string or other non-numeric data type into a numeric data type by means of an appropriate hashing algorithm. In some embodiments, control circuitry 404 may call a function to perform a comparison of Variable A to Variable B. In some embodiments Variable A may be encoded as a primitive data structure, and rather than using a temporary variable, Variable A may be directly used in the comparisons at lines 809 and 811.

At line 808, control circuitry 404 stores the value of Variable B into a temporary variable "B." Similar to Variable A, in some embodiments the value of Variable B will be stored as part of a larger data structure or class, and the value of Variable B may be obtained through accessor methods. In some embodiments Variable B may be converted from a string or other non-numeric data type into a numeric data type by means of an appropriate hashing algorithm, or Variable B may be a primitive data structure, and may be directly used in the comparisons at lines 809 and 811.

At line 809, control circuitry 404 compares the value of A to the value of B to see if they are essentially equivalent. This is achieved by subtracting the value of B from A, taking the absolute value of the difference, and then comparing the absolute value of the difference to a predetermined tolerance level. In some embodiments the tolerance level may be a set percentage of either A or B. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero, or the condition inside the IF statement may be replaced with a strict equivalence between A and B.

At line 810, control circuitry 404 executes a subroutine to assign equal values to weights associated with Variable A and Variable if the condition in line 809 is satisfied.

At line 811, control circuitry 404 compares the value of A and B to determine if A is less than B. In some embodiments this comparison will only be done if A is not essentially equivalent to B and the comparison in line 809 evaluates to FALSE.

At line 812, control circuitry 404 executes a subroutine to adjust a weight associated with Variable B to be greater than a weight associated with Variable A if the condition in line 811 is satisfied.

At line 813, control circuitry 404 determines whether neither condition in line 809 or 811 are satisfied. If neither condition is satisfied, then the instruction at line 814 may be evaluated and executed.

At line 814, control circuitry 404 executes a subroutine to adjust a weight associated with Variable A to be greater than a weight associated with Variable B if neither of the conditions at lines 809 or 811 are satisfied.

At line 816, control circuitry 404 runs a termination subroutine after the algorithm has performed its function. For example, in some embodiments control circuitry 404 may destruct variables, perform garbage collection, free memory or clear the cache of processing circuitry 406.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 810 and 812 to speed operation, or the conditional statements may be replaced with a case-switch. In some embodiments, rather than iterating over all instances of Variable A at step 806, in some embodiments the code may be rewritten so control circuitry 404 is instructed to evaluate multiple instances of Variable A and Variable B simultaneously on a plurality of processors or processor threads, lowering the number of iterations needed and potentially speeding up computation time.

Figure 9:
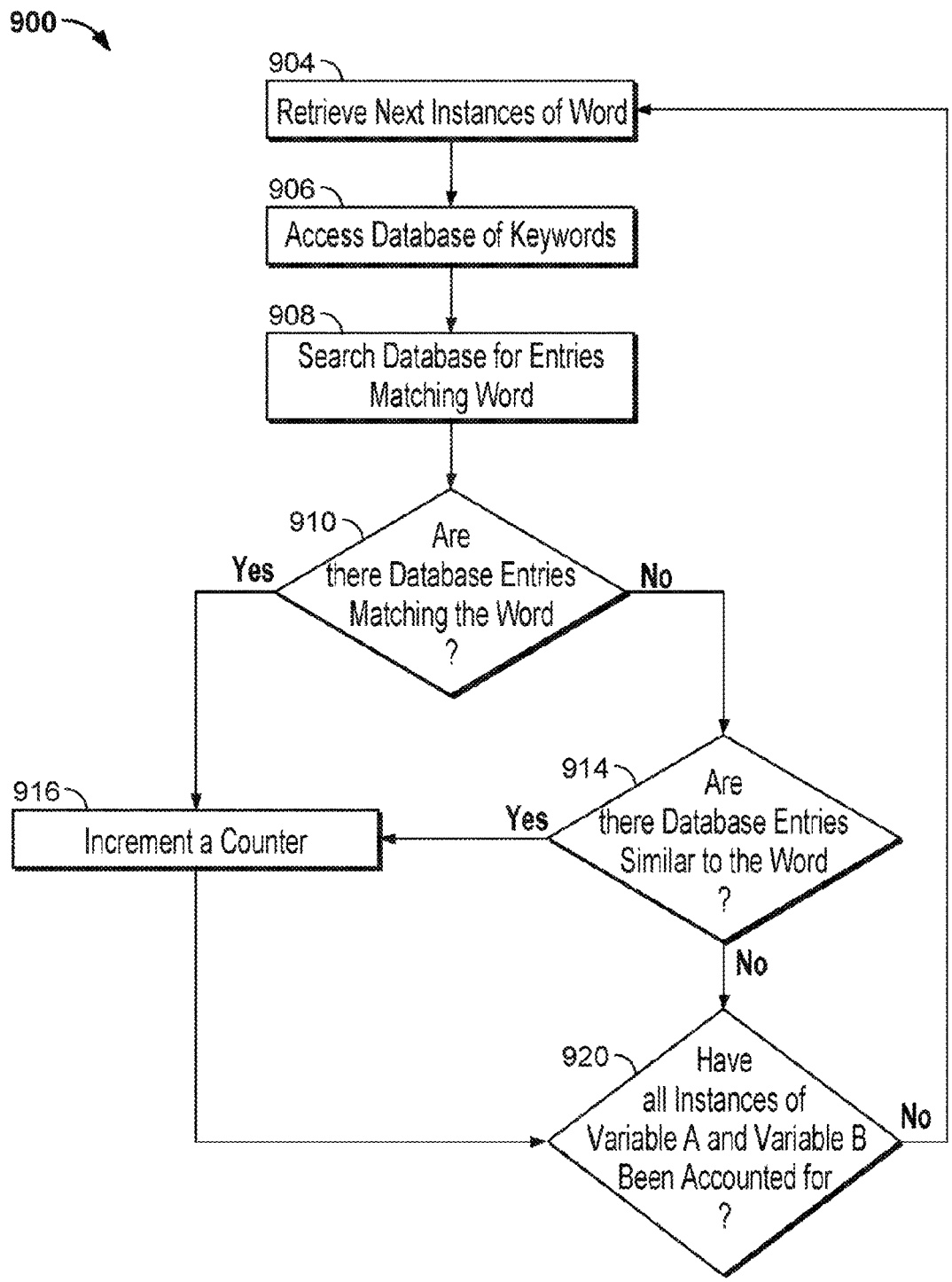
FIG. 9 shows a flowchart for a process implemented on control circuitry to count a number of words in a group that match entries of a database containing keywords in accordance with some embodiments of the disclosure.

FIGS. 9 and 10 present processes implemented on control circuitry (e.g., control circuitry 404) to count a number of words in a group that match entries of a database containing keywords in accordance with some embodiments of the disclosure. As discussed above, in some embodiments it may be necessary to determine whether any words in an electronic communication match keywords corresponding to a media asset. In such embodiments, it may be possible to execute the processes of FIGS. 9 and 10 for each word in the electronic communication to determine if the number of words in the electronic communication that match the keywords is greater than zero. If the number is greater than zero, the electronic communication may be added to a subset. As discussed above, in some embodiments it may be necessary to determine a number of words from a first group of keywords that overlap with keywords in a second group. In such embodiments, it may be possible to execute the processes of FIGS. 9 and 10 for each word in the first group of keywords and count the number of words in the first group that match the keywords in the second group. As discussed above, in some embodiments it may be necessary to determine a number of words from an electronic communication that match keywords corresponding to spoilers. In such embodiments, it may be possible to execute the processes of FIGS. 9 and 10 for each word in the electronic communication and count the number of words in the electronic communication that match the keywords corresponding to spoilers. Similar to the algorithms described by FIGS. 7 and 8, in some embodiments this process may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

The flowchart in FIG. 9 describes a process implemented on control circuitry (e.g., control circuitry 404) to count a number of words in a group that match entries of a database containing keywords in accordance with some embodiments of the disclosure.

At step 904, control circuitry 404 proceeds to retrieve the next instance of a word from stored memory. In some embodiments control circuitry 404 may retrieve a single primitive data structure that represents the word. In some embodiments control circuitry 404 may retrieve the word from a larger class or data structure. The algorithm may proceed to step 906.

At step 906, control circuitry 404 accesses a database containing keywords. In some embodiments, this database may be stored locally (e.g., on storage device 408) prior to beginning the algorithm. In some embodiments the database may also be accessed by using communications circuitry to transmit information across a communications network (e.g., communications network 514) to a database implemented on a remote storage device (e.g., media guidance data source 518). The algorithm my proceed to step 908.

At step 908, control circuitry 404 searches database tables for entries matching the word. In some embodiments control circuitry 404 may submit a general query to the database for table entries matching the word, and control circuitry 404 may receive a list of indices or a data structure containing a portion of the database contents. In some embodiments the database may implement a junction table that in turn cross-references entries from other databases. In this case, control circuitry 404 may retrieve indices from a first database that in turn can be used to retrieve information from a second database. Although we may describe control circuitry 404 interacting with a single database for purposes of clarity, it is understood that the algorithm of FIG. 9 may be implemented using multiple independent or cross-referenced databases. The algorithm may proceed to step 910.

At step 910, control circuitry 404 determines if there are database entries matching the word. In some embodiments control circuitry 404 may receive a signal from the database indicating that there are no matching entries. In some embodiments control circuitry 404 may instead receive a list of indices or data structures with a NULL or dummy value. If control circuitry 404 identifies that there are database entries matching the word the algorithm proceeds to step 916, otherwise the algorithm proceeds to step 914.

At step 914, control circuitry 404 determines if there are database entries similar to the word. For example, in some embodiments, if the word is encoded as a string with multiple characters, control circuitry 404 may perform additional database queries for similar strings with individual characters replaced, removed or added. In some embodiments control circuitry 404 may also determine if the original query was a commonly misspelled word, and will submit a query with the correct spelling instead. In some embodiments control circuitry 404 may retrieve database entries similar to the word without requiring further queries. If control circuitry 404 identifies that there are database entries similar to the word, the algorithm proceeds to step 916; otherwise the algorithm proceeds to step 920.

At step 916, control circuitry 404 executes a subroutine to increment a counter. Afterwards, the algorithm may proceed to step 920.

At step 920, control circuitry 404 determines if all instances of words are accounted for and if further iterations are needed. If further iterations are needed the algorithm will loop back to step 904 where control circuitry 404 will retrieve the next instance of a word. If no further iterations are needed the algorithm will terminate.

It is contemplated that the descriptions of FIG. 9 may be used with any other embodiment of this disclosure. In addition, the descriptions described in relation to process 900 of FIG. 9 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of process 900. As a further example, although step 910 and step 914 are described as being mutually exclusive, both exact entries and similar entries may be processed for a single instance of a word. To further this purpose, in some embodiments step 910 and step 914 may be performed in parallel by control circuitry 404. Furthermore, it should be noted that the process of FIG. 9 may be implemented on a combination of appropriately configured software and hardware, and that any of the devices or equipment discussed in relation to FIGS. 2-5 could be used to implement one or more portions of the algorithm.

The pseudocode in FIG. 10 describes a process 1000 to count a number of words in a group that match entries of a database containing keywords in accordance with some embodiments of the disclosure. It will be evident to one skilled in the art that process 1000 described by the pseudocode in FIG. 10 may be implemented in any number of programming languages and a variety of different hardware, and that the style and format should not be construed as limiting, but rather a general template of the steps and procedures that would be consistent with code used to implement some embodiments of this disclosure.

At line 1001, control circuitry 404 runs a subroutine to initialize variables and prepare to count a number of words in a group that match entries of a database containing keywords which begins on line 1005. For example, in some embodiments control circuitry 404 may copy instructions from non-transitory storage medium (e.g., storage device 408) into RAM or into the cache for processing circuitry 406 during the initialization stage. At line 1001, a counter is initialized to zero.

At line 1005, control circuitry 404 receives instances of words. In some embodiments these instances may be retrieved from stored memory.

At line 1006, control circuitry 404 iterates through the various instances of the words; if only a single instance is available, the loop will only execute once. This loop may be implemented in multiple fashions depending on the choice of hardware and software language used to implement the algorithm of FIG. 10; for example, this may be implemented as part of a "for" or "while" loop, in some programming languages. In some embodiments it may be convenient to store the instances of the words in a single class or encapsulated data structure that will perform the loop as part of an internal method.

At line 1007, control circuitry 404 queries a database for entries matching the word. Depending on how the database is implemented and how each word is stored, an intermittent step may be required to convert each word into a form consistent with the database. For example, the word may encoded into a string or an integer using an appropriate hashing algorithm prior to being transmitted to the database by control circuitry 404 as part of a query. In some embodiments the word may be encoded as a primitive data structure, and control circuitry 404 may submit the word as a query to the database directly. After querying the database, control circuitry 404 may receive a set of database entries matching the word. In some embodiments control circuitry 404 may receive these entries in the form of a data-structure, a set of indices of the database, or a set of indices of another cross-referenced database.

At line 1008, control circuitry 404 will determine if there are any database entries matching the word. In some embodiments control circuitry 404 may determine this by checking if the database returned an empty data structure or a NULL value in response to the query in line 1007. If there are matching database entries the algorithm may proceed to line 1012. If there were no matching database entries the algorithm may instead proceed to line 1011.

At line 1011, control circuitry 404 determines if there are any database entries similar to the word. For example, the word may be represented by an object of a class. Control circuitry 404 may call a function to perform a fuzzy comparison (e.g., a comparison to identify similar objects of the class) by comparing specific fields of the class or by performing approximate string matching on data related to the word. If database entries similar to the word are found by control circuitry 404 then the algorithm proceeds to line 1012. If control circuitry 404 does not find matching entries (e.g., a query to the database returns a NULL value), the algorithm proceeds to line 1017.

At line 1012, control circuitry 404 executes a subroutine to increment a counter. Afterwards, the algorithm may proceed to line 1017.

At line 1017, control circuitry 404 executes a termination subroutine after the algorithm has performed its function and all instances of the words have been processed and checked against the database. For example, in some embodiments control circuitry 404 may destruct variables, perform garbage collection, free memory or clear the cache of processing circuitry 406.

It will be evident to one skilled in the art that process 1000 described by the pseudocode in FIG. 10 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 404 is instructed to evaluate multiple instances of words and submit multiple database queries simultaneously using a plurality of processors or processor threads. It is also understood that although we may describe control circuitry 404 interacting with a single database, this is only a single embodiment described for illustrative purposes, and the algorithm of FIG. 10 may be implemented using multiple independent or cross-referenced databases. For example, a database stored locally (e.g., on storage 408) may index or cross-reference a database stored remotely (e.g., media guidance data source 518), which may be accessible through any number of communication channels (e.g., communications network 514). In some embodiments, this may allow control circuitry 404 to utilize a look-up table or database front-end efficiently stored on a small local drive to access a larger database stored on a remote server on demand.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
    accessing a first transmission time that a first media asset was initially released;
    accessing a second transmission time that a second media asset was initially released, wherein the first transmission time of the first media asset precedes the second transmission time of the second media asset, and wherein the first media asset is distinct from the second media asset;
    determining an availability time that an electronic communication was made available for viewing by a first user, wherein the electronic communication references the first media asset and was transmitted by a device associated with a second user, and wherein the availability time occurs after the first transmission time and prior to the second transmission time;
    calculating a length of time between the first transmission time and the availability time;
    calculating a predicted future time when the first user will be exposed to a spoiler of the second media asset based at least in part on the calculated length of time and the second transmission time, wherein the predicted future time occurs after the second transmission time; and
    generating a notification for the first user, wherein the notification indicates that the first user is predicted to be exposed to the spoiler of the second media asset at the predicted future time.

2. The method of claim 1, wherein the first media asset was initially released by way of simultaneous transmission to a plurality of viewers at the first transmission time,
    wherein the first media asset was not previously simultaneously transmitted to the plurality of viewers prior to the first transmission time,
    wherein the second media asset was initially released by way of simultaneous transmission to the plurality of viewers at the second transmission time, and
    wherein the second media asset was not previously simultaneously transmitted to the plurality of viewers prior to the second transmission time.

3. The method of claim 1, wherein the availability time is a first availability time, wherein the electronic communication is a first electronic communication, and wherein calculating the predicted future time when the first user will be exposed to the spoiler of the second media asset based on the calculated length of time and the second transmission time comprises:
    determining a second availability time that a second electronic communication that references a third media asset was made available for viewing by the first user, wherein the third media asset was initially released at a third transmission time that precedes the second transmission time;
    calculating a second length of time from the third transmission time to the second availability time;
    calculating a first weighted sum by adding the calculated length of time weighted by a first weight and the second length of time weighted by a second weight; and
    adding the first weighted sum to the first transmission time.

4. The method of claim 3, wherein calculating the first weighted sum comprises:
comparing second keywords to first keywords, wherein the second keywords correspond to the second media asset and the first keywords correspond to the first media asset;
determining a first relative number of keywords that overlap between the first keywords and the second keywords;
comparing third keywords with the second keywords, wherein the third keywords correspond to the third media asset;
determining a second relative number of keywords that overlap between the third keywords and the second keywords;
determining that the second relative number of keywords is greater than the first relative number of keywords; and
based on determining that the second relative number of keywords is greater than the first relative number of keywords, adjusting the second weight to be greater than the first weight.

5. The method of claim 1, wherein the availability time is a first availability time, wherein the electronic communication is a first electronic communication, and wherein calculating the predicted future time when the first user will be exposed to the spoiler of the first media asset based on the calculated length of time and the second transmission time comprises:
determining a third availability time of a third electronic communication that was made available for viewing by the first user from a third user, the third electronic communication referencing the first media asset;
calculating a third length of time from the first transmission time to the third availability time;
calculating a second weighted sum by adding the calculated length of time weighted by a first weight and the third length of time weighted by a third weight; and
adding the second weighted sum to the second transmission time.

6. The method of claim 5, wherein calculating the second weighted sum comprises:
determining a first relative number of electronic communications in a first plurality of electronic communications from the second user that the first user viewed during a first period of time;
calculating a first frequency by dividing the first relative number of electronic communications by the first period of time;
determining a second relative number of electronic communications in a second plurality of electronic communications from the third user that the first user viewed during a second period of time;
calculating a second frequency by dividing the second relative number of electronic communications by the second period of time;
determining that the second frequency is greater than the first frequency; and
based on determining that the second frequency is greater than the first frequency, adjusting the third weight to be greater than the first weight.

7. The method of claim 1, wherein the availability time is a first availability time and wherein the electronic communication is a first electronic communication, the method further comprising:
retrieving a first plurality of electronic communications from the second user, wherein the first user has viewed at least one of the first plurality of electronic communications;
retrieving information regarding a respective time when each electronic communication in the first plurality of electronic communications was made available for viewing by the first user;
determining a first subset of the first plurality of electronic communications, wherein each electronic communication in the first subset references the first media asset, by:
comparing respective words from each respective electronic communication of the first plurality of electronic communications with first keywords, wherein the first keywords correspond to the first media asset;
determining that a word of the respective words matches a keyword of the first keywords; and
in response to determining that the word of the respective words matches the keyword of the first keywords, adding the respective electronic communication from which the respective words were derived to the first subset;
wherein the first electronic communication was made available for the viewing of the first user earliest among other electronic communications in the first subset;
wherein calculating the predicted future time when the first user will be exposed to the spoiler of the second media asset based on the calculated length of time and the second transmission time comprises:
selecting a fourth electronic communication from the first subset of the first plurality of electronic communications, wherein the fourth electronic communication has a fourth availability time and was made available for viewing by the first user latest among other electronic communications in the first subset;
calculating a fourth length of time from the first transmission time to the fourth availability time;
calculating a third weighted sum by adding the calculated length of time weighted by a first weight and the fourth length of time weighted by a fourth weight; and
adding the third weighted sum to the second transmission time.

8. The method of claim 7, wherein calculating the third weighted sum comprises:
comparing words from the first electronic communication to fourth keywords, wherein the fourth keywords indicate spoilers;
determining a first relative number of the words from the first electronic communication that match the fourth keywords;
comparing words from the fourth electronic communication to the fourth keywords;
determining a second relative number of the words from the fourth electronic communication that match the fourth keywords;
determining that the second relative number is greater than the first relative number; and
based on determining that the second relative number is greater than the first relative number, adjusting the fourth weight to be greater than the first weight.

9. The method of claim 2, further comprising:
accessing a plurality of media asset identifiers each corresponding to one of a plurality of media assets that were released by way of simultaneous transmission to the plurality of viewers in the past, wherein the plurality of media assets comprises the second media asset;
calculating a plurality of predicted future times, wherein each respective predicted future time of the plurality of predicted future times corresponds to a respective predicted future time when the first user will be exposed to a respective spoiler of a respective media asset of the plurality of media assets;
generating a ranking of the plurality of media assets based on the plurality of predicted future times; and
generating for display the plurality of media asset identifiers in order based on the ranking of the plurality of media assets.

10. The method of claim 1, wherein generating the notification for the first user comprises:
determining a fifth length of time from a current time to the predicted future time;
comparing the fifth length of time to a threshold length of time;
determining that the fifth length of time is smaller than the threshold length of time; and
based on determining that the fifth length of time is smaller than the threshold length of time, generating the notification for the first user.

11. A system comprising:
communications circuitry configured to:
access a first transmission time that a first media asset was initially released;
access a second transmission time that a second media asset was initially released, wherein the first transmission time of the first media asset precedes the second transmission time of the second media asset, and wherein the first media asset is distinct from the second media asset; and
control circuitry configured to:
determine an availability time that an electronic communication was made available for viewing by a first user, wherein the electronic communication references the first media asset and was transmitted by a device associated with a second user, and wherein the availability time occurs after the first transmission time and prior to the second transmission time;
calculate a length of time between the first transmission time and the availability time;
calculate a predicted future time when the first user will be exposed to a spoiler of the second media asset based at least in part on the calculated length of time and the second transmission time, wherein the predicted future time occurs after the second transmission time; and
generate a notification for the first user, wherein the notification indicates that the first user is predicted to be exposed to the spoiler of the second media asset at the predicted future time.

12. The system of claim 11, wherein the first media asset was initially released by way of simultaneous transmission to a plurality of viewers at the first transmission time,
wherein the first media asset was not previously simultaneously transmitted to the plurality of viewers prior to the first transmission time,
wherein the second media asset was initially released by way of simultaneous transmission to the plurality of viewers at the second transmission time, and
wherein the second media asset was not previously simultaneously transmitted to the plurality of viewers prior to the second transmission time.

13. The system of claim 11, wherein the availability time is a first availability time, wherein the electronic communication is a first electronic communication, and wherein the control circuitry is configured to calculate the predicted future time when the first user will be exposed to the spoiler of the second media asset based on the calculated length of time and the second transmission time by:
determining a second availability time that a second electronic communication that references a third media asset was made available for viewing by the first user, wherein the third media asset was initially released at a third transmission time that precedes the second transmission time;
calculating a second length of time from the third transmission time to the second availability time;
calculating a first weighted sum by adding the calculated length of time weighted by a first weight and the second length of time weighted by a second weight; and
adding the first weighted sum to the first transmission time.

14. The system of claim 13, wherein the control circuitry is configured to calculate the first weighted sum by:
comparing second keywords to first keywords, wherein the second keywords correspond to the second media asset and the first keywords correspond to the first media asset;
determining a first relative number of keywords that overlap between the first keywords and the second keywords;
comparing third keywords with the second keywords, wherein the third keywords correspond to the third media asset;
determining a second relative number of keywords that overlap between the third keywords and the second keywords;
determining that the second relative number of keywords is greater than the first relative number of keywords; and
based on determining that the second relative number of keywords is greater than the first relative number of keywords, adjusting the second weight to be greater than the first weight.

15. The system of claim 11, wherein the availability time is a first availability time, wherein the electronic communication is a first electronic communication, and wherein the control circuitry is configured to calculate the predicted future time when the first user will be exposed to the spoiler of the first media asset based on the calculated length of time and the second transmission time by:
determining a third availability time of a third electronic communication that was made available for viewing by the first user from a third user, the third electronic communication referencing the first media asset;
calculating a third length of time from the first transmission time to the third availability time;
calculating a second weighted sum by adding the calculated length of time weighted by a first weight and the third length of time weighted by a third weight; and
adding the second weighted sum to the first-second transmission time.

16. The system of claim 15, wherein the control circuitry is configured to calculate the second weighted sum by:
determining a first relative number of electronic communications in a first plurality of electronic communications from the second user that the first user viewed during a first period of time;

calculating a first frequency by dividing the first relative number of electronic communications by the first period of time;

determining a second relative number of electronic communications in a second plurality of electronic communications from the third user that the first user viewed during a second period of time;

calculating a second frequency by dividing the second relative number of electronic communications by the second period of time;

determining that the second frequency is greater than the first frequency; and based on determining that the second frequency is greater than the first frequency, adjusting the third weight to be greater than the first weight.

17. The system of claim 11, wherein the availability time is a first availability time, wherein the electronic communication is a first electronic communication, and wherein the communications circuitry is further configured to:

retrieve a first plurality of electronic communications from the second user, wherein the first user has viewed at least one of the first plurality of electronic communications; and retrieve information regarding a respective time when each electronic communication in the first plurality of electronic communications was made available for viewing by the first user; and wherein the control circuitry is further configured to:

determine a first subset of the first plurality of electronic communications, wherein each electronic communication in the first subset references the first media asset, by:

comparing respective words from each respective electronic communication of the first plurality of electronic communications with first keywords, wherein the first keywords correspond to the first media asset;

determining that a word of the respective words matches a keyword of the first keywords; and in response to determining that the word of the respective words matches the keyword of the first keywords, adding the respective electronic communication from which the respective words were derived to the first subset;

wherein the first electronic communication was made available for the viewing of the first user earliest among other electronic communications in the first subset; and wherein the control circuitry is configured to calculate the predicted future time when the first user will be exposed to the spoiler of the second media asset based on the calculated length of time and the second transmission time by:

selecting a fourth electronic communication from the first subset of the first plurality of electronic communications, wherein the fourth electronic communication has a fourth availability time and was made available for viewing by the first user latest among other electronic communications in the first subset;

calculating a fourth length of time from the first transmission time to the fourth availability time;

calculating a third weighted sum by adding the calculated length of time weighted by a first weight and the fourth length of time weighted by a fourth weight; and adding the third weighted sum to the second transmission time.

18. The system of claim 17, wherein the control circuitry is configured to calculate the third weighted sum by:

comparing words from the first electronic communication to fourth keywords, wherein the fourth keywords indicate spoilers;

determining a first relative number of the words from the first electronic communication that match the fourth keywords;

comparing words from the fourth electronic communication to the fourth keywords;

determining a second relative number of the words from the fourth electronic communication that match the fourth keywords;

determining that the second relative number is greater than the first relative number; and based on determining that the second relative number is greater than the first relative number, adjusting the fourth weight to be greater than the first weight.

19. The system of claim 12, wherein the communications circuitry is further configured to:

access a plurality of media asset identifiers each corresponding to one of a plurality of media assets that were released by way of simultaneous transmission to the plurality of viewers in the past, wherein the plurality of media assets comprises the second media asset; and wherein the control circuitry is further configured to:

calculate a plurality of predicted future times, wherein each respective predicted future time of the plurality of predicted future times corresponds to a respective predicted future time when the first user will be exposed to a respective spoiler of a respective media asset of the plurality of media assets;

generate a ranking of the plurality of media assets based on the plurality of predicted future times; and generate for display the plurality of media asset identifiers in order based on the ranking of the plurality of media assets.

20. The system of claim 11, wherein the control circuitry is configured to generate the notification for the first user by:

determining a fifth length of time from a current time to the predicted future time;

comparing the fifth length of time to a threshold length of time;

determining that the fifth length of time is smaller than the threshold length of time; and based on determining that the fifth length of time is smaller than the threshold length of time, generating the notification for the first user.

* * * * *

UNITED STATES PATENT AND TRADEMARK OFFICE
CERTIFICATE OF CORRECTION

PATENT NO. : 12,373,711 B2
APPLICATION NO. : 17/951933
DATED : July 29, 2025
INVENTOR(S) : Mathew C. Burns et al.

Page 1 of 1

It is certified that error appears in the above-identified patent and that said Letters Patent is hereby corrected as shown below:

In the Claims

Claim 15, Column 62, Line 60, replace "first-second" with --second--

Signed and Sealed this
Sixteenth Day of September, 2025

Coke Morgan Stewart
*Acting Director of the United States Patent and Trademark Office*